(12) United States Patent
Hara

(10) Patent No.: US 10,296,106 B2
(45) Date of Patent: May 21, 2019

(54) POSITION DETECTOR AND POSITION POINTER

(71) Applicant: Wacom Co., Ltd., Saitama (JP)

(72) Inventor: Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/965,388

(22) Filed: Apr. 27, 2018

(65) Prior Publication Data

US 2018/0246585 A1   Aug. 30, 2018

Related U.S. Application Data

(63) Continuation of application No. 15/605,430, filed on May 25, 2017, which is a continuation of application (Continued)

(30) Foreign Application Priority Data

May 23, 2014   (JP) ................. 2014-106886

(51) Int. Cl.
*G06F 3/0346* (2013.01)
*G06F 1/3206* (2019.01)
(Continued)

(52) U.S. Cl.
CPC .......... *G06F 3/0346* (2013.01); *G06F 1/3206* (2013.01); *G06F 1/3296* (2013.01);
(Continued)

(58) Field of Classification Search
CPC .. G06F 3/0346; G06F 3/03545; G06F 3/0414; G06F 3/0416; G06F 3/044; G06F 1/3206; G06F 1/3296; Y02D 10/172
See application file for complete search history.

(56) References Cited

U.S. PATENT DOCUMENTS

| 5,206,785 A | 4/1993 | Hukashima |
| 2010/0321313 A1 | 12/2010 | Oda et al. |

(Continued)

FOREIGN PATENT DOCUMENTS

| JP | 4-96212 A | 3/1992 |
| JP | 2011-3035 A | 1/2011 |

(Continued)

OTHER PUBLICATIONS

Partial European Search Report dated Sep. 28, 2015, for corresponding EP Application No. 15168892.6-1959, 6 pages.

*Primary Examiner* — Peter D McLoone
(74) *Attorney, Agent, or Firm* — Seed IP Law LLP

(57) ABSTRACT

A position detector includes a position pointer having an AC signal generation circuit that is disposed in a housing and that transmits an AC signal, and a sensor that receives the AC signal. The position detector detects the position pointed to by the position pointer on the sensor. The position pointer includes at least three electrodes electrically isolated from each other, and a control circuit that controls so that the AC signal is selectively supplied to the electrodes, and so that identification information identifying the electrode to which the AC signal is selectively supplied is generated and transmitted to the sensor. The position detector further includes a position detection circuit that detects the position based on the AC signal, and an angular information calculation circuit that calculates the rotation angle and/or the tilt angle of the position pointer based on the AC signal and the identification information.

16 Claims, 16 Drawing Sheets

Related U.S. Application Data

No. 14/667,567, filed on Mar. 24, 2015, now Pat. No. 9,665,184.

(51) Int. Cl.
| | | |
|---|---|---|
| *G06F 1/3296* | (2019.01) | |
| *G06F 3/041* | (2006.01) | |
| *G06F 3/0354* | (2013.01) | |
| *G06F 3/044* | (2006.01) | |

(52) U.S. Cl.
CPC .......... *G06F 3/03545* (2013.01); *G06F 3/044* (2013.01); *G06F 3/0414* (2013.01); *G06F 3/0416* (2013.01); *Y02D 10/172* (2018.01)

(56) References Cited

U.S. PATENT DOCUMENTS

| | | |
|---|---|---|
| 2010/0321314 A1 | 12/2010 | Oda et al. |
| 2010/0321315 A1 | 12/2010 | Oda et al. |
| 2010/0321331 A1 | 12/2010 | Oda et al. |
| 2010/0321332 A1 | 12/2010 | Oda et al. |
| 2010/0321333 A1 | 12/2010 | Oda et al. |
| 2010/0321334 A1 | 12/2010 | Oda et al. |
| 2011/0241703 A1 | 10/2011 | Fukushima et al. |
| 2012/0146940 A1 | 6/2012 | Yamamoto et al. |
| 2012/0154340 A1 | 6/2012 | Vuppu et al. |
| 2012/0327042 A1 | 12/2012 | Harley et al. |
| 2013/0106718 A1* | 5/2013 | Sundara-Rajan ... G06F 3/03545 345/173 |
| 2013/0207938 A1 | 8/2013 | Ryshtun et al. |
| 2013/0300670 A1 | 11/2013 | Besperstov et al. |
| 2014/0043301 A1 | 2/2014 | Katsurahira |
| 2015/0317001 A1 | 11/2015 | Ben-Bassat et al. |
| 2016/0188016 A1 | 6/2016 | Munakata et al. |
| 2016/0320895 A1 | 11/2016 | Ribeiro |
| 2018/0136768 A1 | 5/2018 | Tanaka et al. |

FOREIGN PATENT DOCUMENTS

| | | |
|---|---|---|
| JP | 2011-3036 A | 1/2011 |
| JP | 2012-123599 A | 6/2012 |
| JP | 2014-35631 A | 2/2014 |

* cited by examiner

POSITION DETECTOR AND POSITION POINTER

BACKGROUND

Technical Field

The present invention relates to a position detector capable of detecting the tilt and the rotation angle of, for example, a pen-shaped position pointer, and to a position pointer of the position detector.

Description of the Related Art

A pen-shaped position pointer is used, for example, to enter text and drawings. In this case, there is a demand to not only enter coordinate values as an input but also enter the rotation and tilt of the pen based, for example, on the manner in which the user twists his or her hand or on personal habits as data.

To respond to this demand, an invention has been proposed, for example, in Patent Document 1 (Japanese Patent Laid-Open No. 2014-35631) which is designed to detect the tilt angle of the position pointer on the sensor surface of the position detector or the rotation angle of the position pointer about the axis perpendicular to the sensor surface.

In Patent Document 1, first and second electrodes are provided on a core body to detect the rotation angle of the position pointer. The first and second electrodes are alternately selected to change the electrode from which to transmit an AC (alternating current) signal. At this time, signal transmission pattern information is included in the AC signal transmitted from the position pointer. The signal transmission pattern information indicates from which electrode, namely, the first or second electrode, an AC signal is transmitted.

The position detector calculates the rotation angle of the position pointer about the axis perpendicular to the sensor surface based on a plurality of coordinate positions on the sensor surface on which the AC signal from the position pointer has been received. The coordinate positions are found in relation to pattern information received from the position pointer.

Further, in Patent Document 1, three electrodes are provided on a housing to detect the tilt angle of the position pointer. Moreover, a switching circuit is provided which supplies an AC signal to one of the electrodes selected in advance based on a predetermined pattern. Then, the position pointer transmits, to the position detector, pattern information indicating the pattern type when the pattern is changed by the switching circuit.

The position detector calculates the tilt angle of the position pointer relative to the sensor surface from at least three coordinate positions and three signal intensities that are obtained for at least three pieces of pattern information received.

In this case, paragraph 0114 of Patent Document 1 states the following: "In the position pointer according to the present embodiment, three patterns or first, second and third patterns, are available. The first pattern selects only an electrode 40. The second pattern selects only an electrode 41. The third pattern selects only an electrode 42 . . . . When the first pattern is selected, a 'code' following a start signal is '0.' When the second or third pattern is selected, the 'code' following a start signal is '1.' This allows the tablet to identify from which electrode of the position pointer the signal was transmitted in consideration of the transmission sequence described above."

As described above, in the detection method of the position pointer's tilt angle in Patent Document 1, the position pointer does not transmit identification information about each of the three electrodes. Therefore, if it is difficult for the position detector to detect an AC signal from any of the three electrodes of the position pointer, it is difficult for the position detector to distinguish between the three patterns. As a result, it is likely that the position detector may not properly detect the rotation angle and the tilt angle.

BRIEF SUMMARY

It is desirable to provide a position pointer and a position detector capable of solving the above problem.

According to a first embodiment of the present invention, there is provided a position detector. The position detector includes a position pointer and a sensor. The position pointer includes an AC signal generation circuit in a pen-shaped housing. The position pointer transmits an AC signal generated by the AC signal generation circuit. The sensor receives the AC signal transmitted from the position pointer. The position detector detects the position pointed to by the position pointer on the sensor. The position pointer includes at least three electrodes. The electrodes are electrically isolated from each other at a tip portion of the pen-shaped housing and disposed surrounding a given axial position of the housing. The position pointer further includes a control circuit which controls so that the AC signal generated by the AC signal generation circuit is selectively supplied to the at least three electrodes, and so that identification information identifying the electrode to which the AC signal is selectively supplied is generated and transmitted to the sensor. The sensor includes a plurality of conductors arranged in a first direction and a plurality of conductors arranged in a second direction different from the first direction. The position detector includes a position detection circuit and an angular information calculation circuit. The position detection circuit detects the position pointed to by the position pointer on the sensor based on the AC signal received by the sensor and transmitted from the position pointer. The angular information calculation circuit calculates at least one of: the rotation angle and the tilt angle of the position pointer on the sensor based on the AC signal and the identification information received by the sensor and transmitted from the position pointer.

In the position detector configured as described above according to the first embodiment of the present invention, the position pointer includes at least three electrodes. The electrodes are electrically isolated from each other at the tip portion of the pen-shaped housing and disposed surrounding a given axial position of the housing. Then, the control circuit of the position pointer controls so that the AC signal generated by the AC signal generation circuit is selectively supplied to the at least three electrodes, and so that the identification information identifying the electrode to which the AC signal is selectively supplied is generated and transmitted to the sensor.

Then, the angular information calculation circuit of the position detector calculates at least one of the rotation angle and the tilt angle of the position pointer on the sensor, based on the AC signal and the identification information received by the sensor from the position pointer. That is, the AC signal is transmitted to the sensor of the position detector together with identification information identifying the electrode to which the AC signal is transmitted. This allows the position detector to know from which electrode of the plurality of electrodes of the position pointer the AC signal has been received, thus making it easy to properly detect the rotation angle and the tilt angle of the position pointer.

Further, according to a second embodiment of the present invention, there is provided a position detector. The position detector includes a position pointer and a sensor. The position pointer includes an AC signal generation circuit in a pen-shaped housing. The position pointer transmits an AC signal generated by the AC signal generation circuit. The sensor receives the AC signal transmitted from the position pointer. The position detector detects the position pointed to by the position pointer on the sensor. The position pointer includes a first electrode and at least three second electrodes at a tip portion of the pen-shaped housing. The first electrode is disposed at a given axial position of the housing. The at least three second electrodes are electrically isolated from each other and are disposed surrounding the given axial position of the housing. The position pointer further includes a control circuit which controls so that the AC signal generated by the AC signal generation circuit is supplied to the first electrode, so that one or more of the at least three second electrodes are selectively set to a given potential, and so that identification information identifying the second electrode that is selectively set to the given potential is generated and transmitted to the sensor. The sensor includes a plurality of conductors arranged in a first direction and a plurality of conductors arranged in a second direction different from the first direction. The position detector includes a position detection circuit and an angular information calculation circuit. The position detection circuit detects the position pointed to by the position pointer on the sensor based on the AC signal received by the sensor and transmitted from the first electrode of the position pointer. The angular information calculation circuit calculates at least one of: the rotation angle and the tilt angle of the position pointer on the sensor based on the AC signal and the identification information received by the sensor and transmitted from the position pointer.

In the second embodiment of the invention configured as described above, the position pointer includes the at least three second electrodes in addition to the first electrode. The first electrode is disposed at the given axial position of the housing and transmits the AC signal to the sensor. The at least three second electrodes are disposed surrounding the given axial position of the housing and are selectively set to the given potential by the control circuit. The control circuit also controls so that identification information identifying the second electrode that is selectively set to the given potential is generated and transmitted to the sensor.

In the present embodiment, switching the second electrode to which a given fixed potential is to be applied changes the distribution pattern of transmission of the AC signal from the first electrode. That is, when one of the second electrodes is set to the given fixed potential, such as a ground potential or a supply voltage potential, the distribution pattern of transmission of the AC signal from the first electrode is affected by the second electrode that has been set to the given fixed potential. In the present embodiment, therefore, the distribution pattern of transmission of the AC signal can be changed as in the first embodiment of the present invention by changing the second electrode that is set to the given fixed potential.

Then, which transmission distribution pattern is selected can be found from identification information indicating which second electrode is set to the given fixed potential.

The identification information is transmitted from the position pointer together with the AC signal. This allows the position detector to know which of the plurality of second electrodes is set to the given potential when the AC signal is received from the position pointer, thus making it easy to properly detect the rotation angle and the tilt angle of the position pointer.

In the position pointer according to the first embodiment of the present invention, the AC signal is transmitted to the sensor of the position detector together with identification information identifying each of the three or more electrodes. As a result, the position detector according to the present embodiment can recognize from which of the plurality of electrodes of the position pointer the AC signal was received, thus making it easy to properly detect the rotation angle and the tilt angle of the position pointer.

Further, in the position pointer according to the second embodiment of the present invention, the distribution pattern of transmission of the AC signal is changed by changing the second electrode that is set to the given fixed potential. Which transmission distribution pattern is selected can be found since identification information indicating which second electrode is set to the given fixed potential is transmitted to the sensor of the position detector together with the AC signal. This allows the position detector to recognize which of the plurality of second electrodes is set to the given potential when the AC signal is received from the position pointer, thus making it easy to properly detect the rotation angle and the tilt angle of the position pointer.

DETAILED DESCRIPTION

A description will be given below of several embodiments of the position detector according to the present invention with reference to the accompanying drawings.

First Embodiment

<Configuration Example of the Position Pointer>

Figure 1:
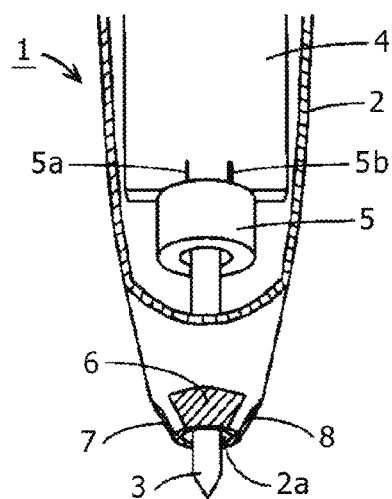
FIG. 1 is a diagram illustrating a configuration example of major components of a position pointer of a position detector according to a first embodiment of the present invention.
Figure 2:
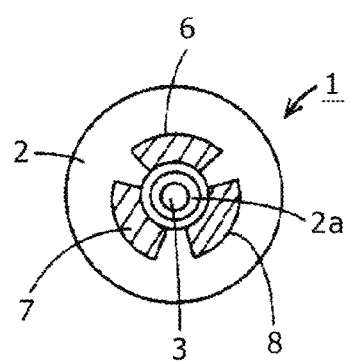
FIG. 2 is a diagram illustrating a configuration example of major components of the position pointer of the position detector according to the first embodiment of the present invention.

FIG. 1 is a diagram illustrating the structure of a position pointing section (core body side) of a position pointer 1 in a position detector according to a first embodiment of the present invention. FIG. 2 is a diagram illustrating the position pointer 1 as seen from the core body side.

The position pointer 1 has an opening 2a on the position pointing section side (pen tip side) of a tubular housing 2 in the shape of a pen as a whole. A core body 3 is disposed in such a manner as to protrude outside from the housing 2 through the opening 2a, and, in this example, in an insertable and withdrawable manner. The core body 3 plays a role of transmitting the pressure (writing pressure) applied to the pen tip of the position pointer 1. In this example, the core body 3 is molded from plastic or other insulating material.

A printed circuit board 4 is disposed in the housing 2 of the position pointer 1 as illustrated in FIG. 1. A variable capacitor 5 serving, for example, as a pressure detection sensor is also disposed in the housing 2. Electrodes 5a and 5b provided at both ends of the variable capacitor 5 are connected to the printed circuit board 4. The variable capacitor 5 includes a coupling section. The end portion of the core body 3 on the opposite side of the pen tip is inserted into and coupled to the coupling section. The coupling section moves slightly together with the core body 3 in response to the pressure (writing pressure) applied to the core body 3. Thanks to this movement, the capacitance of the variable capacitor 5 changes because of the pressure (writing pressure) applied via the core body 3. In the present embodiment, the core body 3 is coupled to the coupling section of the variable capacitor 5 in an insertable and withdrawable manner. The variable capacitor disclosed, for example, in Japanese Patent Laid-Open No. Hei 04-96212 can be used as the variable capacitor 5. The detailed description of the configuration thereof is omitted here.

Then, in the present embodiment, at least the position pointing section side of the housing 2 of the position pointer 1 is made of resin or other insulating material. In the present example, three electrodes 6, 7, and 8 are circumferentially formed on the area in the shape of a truncated cone near the opening 2a of the housing 2 in such a manner as to axially surround the housing 2. The electrodes 6, 7, and 8 are electrically isolated from each other. In the case of the present example, the three electrodes 6, 7, and 8 are formed to surround the core body 3 as illustrated in FIGS. 1 and 2.

In this case, the electrodes 6, 7, and 8 are made, for example, of a conductive metallic material or a conductive resin. The electrodes 6, 7, and 8 are of the same shape and size and formed to be circumferentially apart from each other by the same distance. Therefore, the electrodes 6, 7, and 8 are arranged to be 120 degrees apart from each other in the present embodiment.

The three electrodes 6, 7, and 8 are formed on the outer perimeter portion of the area in the shape of a truncated cone near the opening 2a of the housing 2 by forming, for example, recessed portions that are shaped respectively to match the electrodes 6, 7, and 8, fitting the electrodes 6, 7, and 8 into the recessed portions, and bonding or coating the electrodes 6, 7, and 8. Then, each of the electrodes 6, 7, and 8 is electrically connected to the printed circuit board 4 by a wire that is not shown.

It should be noted that the three electrodes 6, 7, and 8 may be formed on the outer perimeter portion of the area in the shape of a truncated cone near the opening 2a of the housing 2 by coating or printing. Alternatively, the three electrodes 6, 7, and 8 may be formed on the side of the inner wall near the opening 2a of the housing 2. Still alternatively, the three electrodes 6, 7, and 8 are not limited in material to a conductive metallic material and may be made of a conductive rubber or other conductive resin material.

Figure 3:
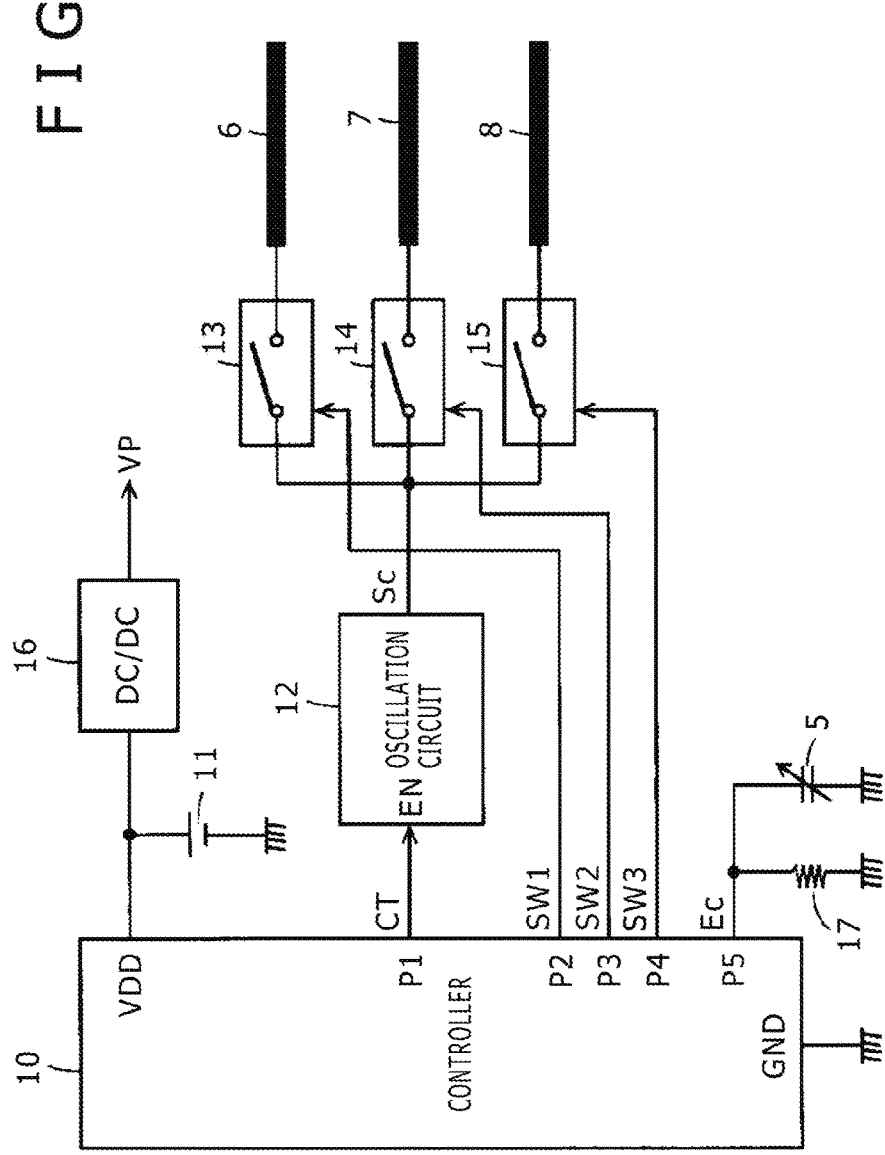
FIG. 3 is a diagram illustrating an example of an internal circuit configuration of the position pointer of the position detector according to the first embodiment of the present invention.

FIG. 3 is a circuit configuration diagram of the position pointer 1 according to the first embodiment. That is, the position pointer 1 includes a controller 10, a battery 11 such as dry cell or chargeable secondary cell, an oscillation circuit 12, switching circuits 13, 14 and 15, and a DC/DC converter 16 (DC: direct current). Then, the variable capacitor 5 is connected to the controller 10.

The controller 10 includes, for example, a microprocessor and makes up a control circuit configured to control processing operation of the position pointer 1 as will be described later. A supply voltage VDD is supplied to the controller 10 from the battery 11 as an example of drive power source. The controller 10 not only controls the oscillation circuit 12 and each of the switching circuits 13, 14, and 15 to turn ON or OFF but also detects the writing pressure applied via the core body 3 of the position pointer 1 by monitoring the capacitance of the variable capacitor 5 as will be described later. In the present embodiment, the controller 10 detects the writing pressure from the discharge time of the variable capacitor 5 as will be described later.

The oscillation circuit 12 generates an AC signal at a given frequency f1 such as f1=1.8 MHz. That is, the oscillation circuit 12 makes up an AC signal generation circuit. The controller 10 controls the oscillation circuit 12 to turn ON or OFF by supplying a control signal (enable signal CT) to an enable terminal EN of the oscillation circuit 12. Therefore, the oscillation circuit 12 interrupts the generation of an AC signal in response to the enable signal CT from the controller 10, thus generating an ASK (Amplitude Shift Keying) modulated signal. That is, the ASK modulated signal can be generated by controlling the enabling of the oscillation circuit 12 by the controller 10. In the present embodiment, the position pointer 1 uses the ASK modulated signal to transmit a continuous transmission signal (burst signal), identification information for identifying each of the electrodes 6, 7, and 8, and writing pressure information. The burst signal is used not only to detect the position pointed to by the position pointer 1 but also to allow for signal demodulation by the controller 10 in synchronism with the transmission timing of the signal from the position pointer 1 as will be described later.

The AC signal from the oscillation circuit 12 is supplied to the electrodes 6, 7, and 8 respectively via the switching circuits 13, 14, and 15 in the present embodiment. The switching circuits 13, 14, and 15 are controlled to turn ON or OFF respectively by switching control signals SW1, SW2, and SW3, from the controller 10.

The DC/DC converter 16 steps up the voltage of the battery 11, thus generating power at a high voltage VP. The voltage VP is used to activate the switching circuits 13, 14, and 15, and it is necessary for the voltage VP to be higher in amplitude than the AC signal supplied from the oscillation circuit 12. For this reason, the voltage of the battery 11 is stepped up by the DC/DC converter 16 to generate the voltage VP.

<Example of Processing Operation of the Position Pointer 1>

Figure 4:
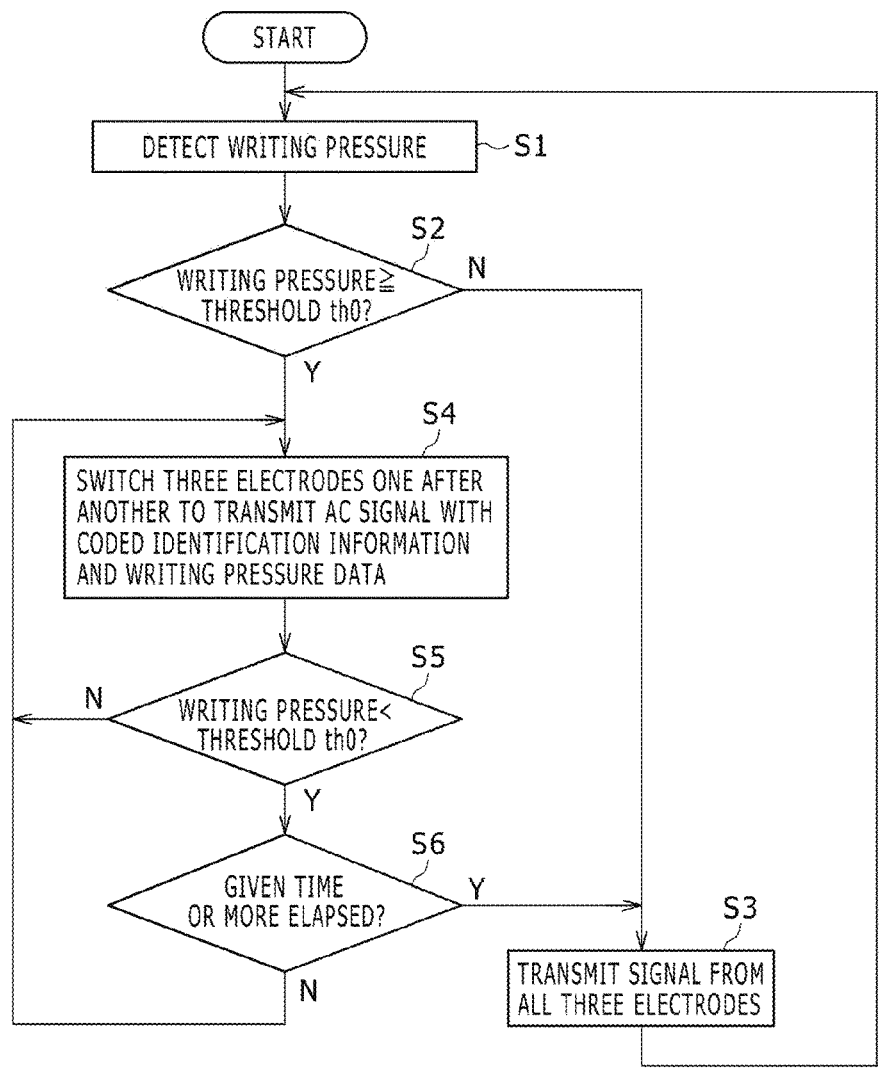
FIG. 4 is a diagram illustrating a flowchart describing an example of processing performed by the position pointer of the position detector according to the first embodiment of the present invention.

FIG. 4 is a flowchart for describing an example of processing performed by the controller 10 of the position pointer 1 according to the first embodiment.

The controller 10 detects the writing pressure (step S1). In this example, the writing pressure is calculated based on the time it takes for the charged variable capacitor 5 to discharge until a charged voltage Ec thereof reaches a given threshold. That is, the variable capacitor 5 has a capacitance proportional to the writing pressure. The charged voltage Ec is a voltage proportional to the capacitance at that time. The time it takes for the variable capacitor 5 to discharge until the charged voltage Ec reaches the given threshold is proportional to the writing pressure. A description will be given later of the detection of the writing pressure.

Next, the controller 10 determines whether or not the writing pressure found in step S1 is equal to or greater than a given threshold th0 (step S2). Here, the threshold th0 is set, for example, to a writing pressure obtained when the core body 3 of the position pointer 1 comes in contact with the sensor surface of the position detector and slightly presses the sensor surface.

When determining in step S2 that the found writing pressure is smaller than the threshold th0, the controller 10 supplies the switching control signals SW1, SW2, and SW3 respectively to the switching circuits 13, 14, and 15 to turn ON so that the AC signal from the oscillation circuit 12 is transmitted from all the electrodes 6, 7, and 8 (step S3).

In step S3, the controller 10 controls the oscillation circuit 12 to intermittently repeat a continuous transmission period in which the AC signal is continuously transmitted for a given period of time. Alternatively, the controller 10 may control the oscillation circuit 12 to generate, following the continuous transmission period, a writing pressure data transmission period during which writing pressure data is transmitted, intermittently repeating a period made up of the continuous transmission period and the writing pressure data transmission period. The continuous transmission signal transmitted from the position pointer 1 is a burst signal having a given duration. In the position detector, the continuous transmission signal is received by the sensor and used to detect the position pointed to by the position pointer 1 on the sensor. The continuous transmission signal is also used as a synchronizing signal to achieve timing synchronization of reception and decoding of coded data such as writing pressure data transmitted after the continuous transmission signal relative to the signal transmitted from the position pointer 1. Signal processing is performed by the position detector in synchronism with this burst signal. Then, the controller 10 returns to step S1 after step S3 to repeat the processes from step S1 onward.

The processes from step S1 to step S3 are performed before the position pointer 1 makes a position pointing input to the sensor of the positon detector. These processes are performed when the position pointer 1 approaches (when the pointer is in a so-called hovering condition over) the sensor of the position detector and designed to ensure proper detection of contact of the position pointer 1 with the sensor surface from the hovering condition. That is, the transmission of the AC signal from the position pointer 1 simultaneously from all the three electrodes 6, 7, and 8 provides greater energy for transmitting the AC signal than if the AC signal is transmitted from one of the three electrodes 6, 7, and 8. This makes it easier for the sensor of the position detector to detect the AC signal from the position pointer 1.

When determining in step S2 that the found writing pressure is equal to or larger than the threshold th0, the controller 10 exercises control in the present embodiment so that the switching circuits 13, 14, and 15 are turned ON one after another to transmit the AC signal from the oscillation circuit 12 from the electrodes 6, 7, and 8 one after another (step S4). This is intended to detect the position pointed to by the position pointer 1 and permit detection of the rotation angle and the tilt angle of the position pointer 1. Then, the controller 10 generates, in step S4, the enable signal CT to match the ON period of each of the switching circuits 13, 14, and 15, supplying the enable signal CT to the oscillation circuit 12. The enable signal CT is used to control the enabling of the oscillation circuit 12.

A description will be given below of processing performed by the controller 10 at this time with reference to the timing charts shown in FIGS. 5A to 5D.

That is, as illustrated in FIG. 5A, the controller 10 turns ON the switching circuit 13 first and leaves the other switching circuits 14 and 15 OFF so that only the electrode 6 of the three electrodes 6, 7, and 8 is selected. Then, with the electrode 6 selected, the controller 10 maintains the enable signal CT at a terminal P1 at a high level for a given period of time as illustrated in FIG. 5B so that an AC signal Sc is continuously output from the oscillation circuit 12 for the given period of time. As a result, the electrode 6 continuously emits the AC signal Sc for the given period of time (refer to a continuous transmission period (6) in FIG. 5D).

The controller 10 finds the writing pressure applied to the variable capacitor 5 by controlling a terminal P5 during the continuous transmission period (6). That is, the controller 10 pulls the terminal P5, to which the variable capacitor 5 is connected, up to the high level, thus charging the variable capacitor 5. Next, the controller 10 switches the terminal P5 to an input state. At this time, the charge stored in the variable capacitor 5 is discharged by a resistor 17 that is connected in parallel with the variable capacitor 5, thus causing the voltage Ec (refer to FIG. 5C) of the variable capacitor 5 to drop gradually. The controller 10 finds a time Tp from when the terminal P5 is switched to the input state to when the voltage Ec of the variable capacitor 5 drops below the predetermined threshold voltage. The time Tp corresponds to the writing pressure to be found. The controller 10 finds the writing pressure, for example, as a 10-bit value from the time Tp.

When the continuous transmission period (6) ends, the controller 10 pulls the terminal P1 up to the high level or down to a low level during a given period Td, thus controlling the oscillation circuit 12 and performing ASK modulation based on the AC signal Sc. At this time, the controller 10 pulls the enable signal CT up to the high level and outputs the enable signal CT for a given period of time (refer to the start signal in FIG. 5D) at the first time. The start signal is provided for the position detector to be able to correctly determine the subsequent data transmission times. That is, the start signal is provided to synchronize signal processing by the position detector such as ASK demodulation with the transmission time of the start signal from the position pointer 1 received by the position detector. Although the continuous transmission signal in the continuous transmission period (6) can be used as a transmission time of the signal emitted from the position pointer 1 for synchronization of signal processing performed by the positon detector as described earlier, it is also possible to use this start signal for synchronization of signal processing performed by the position detector such as ASK demodulation.

The two Td periods following the start signal are the periods during which identification information is transmitted. Identification information identifies the electrode 6 configured to supply the AC signal Sc. In this example, the controller 10 controls the terminal P1 so that code "00" is assigned to the electrode 6 as two-bit identification information as illustrated in FIG. 5D. A two-bit code is used to identify each of the three electrodes 6, 7, and 8.

The controller 10 sequentially transmits 10-bit writing pressure data, found from the above operation, after the identification information of the electrode 6. That is, when the transmission data is "0," the controller 10 pulls the terminal P1 down to the low level so as to interrupt the generation of the AC signal from the oscillation circuit 12. On the other hand, when the transmission data is "1," the controller 10 pulls the terminal P1 up to the high level so as to permit the generation of the AC signal from the oscillation circuit 12, thus achieving ASK modulation (refer to a writing pressure data transmission period in FIG. 5D). FIG. 5B shows that the transmitted writing pressure is "0101110101" during an electrode 6 selection period shown in FIG. 5A.

When the transmission of the 10-bit writing pressure data ends, the controller 10 turns OFF the switching circuits 13 and 15 and turns ON only the switching circuit 14 using the switching control signals SW1, SW2, and SW3 to terminate the electrode 6 selection period and switch over to an electrode 7 selection period.

Then, during the electrode 7 selection period, the controller 10 maintains the enable signal CT at the terminal P1 at the high level for the given period of time as illustrated in FIG. 5B as during the electrode 6 selection period, thus causing the AC signal Sc to be continuously output from the oscillation circuit 12 for the given period of time. This causes the electrode 7 to continuously output the AC signal Sc for the given period of time (refer to a continuous transmission period (7) in FIG. 5D).

When the continuous transmission period (7) ends, the controller 10 pulls the terminal P1 up to the high level, thus transmitting the start signal. Then, in this example, the controller 10 controls the terminal P1 so that code "10" is assigned as two-bit identification information for identifying the electrode 7. In this example, no writing pressure detection operation is performed, and no writing pressure data is transmitted during the electrode 7 selection period. Of course, the writing pressure detection operation may be performed, and writing pressure data may be transmitted during the electrode 7 selection period.

When the transmission of the electrode 7 identification information ends after the continuous transmission period (7) during the electrode 7 selection period, the controller 10 turns OFF the switching circuits 13 and 14 and turns ON only the switching circuit 15 using the switching control signals SW1, SW2, and SW3 to terminate the electrode 7 selection period and switch over to an electrode 8 selection period.

During the electrode 8 selection period, the controller 10 maintains the enable signal CT at the terminal P1 at the high level for the given period of time as illustrated in FIG. 5B as during the electrode 7 selection period, thus providing a continuous transmission period (8) in which the AC signal Sc is continuously output from the oscillation circuit 12 for the given period of time.

Then, when the continuous transmission period (8) ends, the controller 10 transmits the start signal by pulling the terminal P1 up to the high level and controls the terminal P1 so that code "01" is assigned in this example as two-bit identification information for identifying the electrode 8. In this example, no writing pressure detection operation is performed, and no writing pressure data is transmitted during the electrode 8 selection period. Of course, the writing pressure detection operation may be performed, and writing pressure data may be transmitted during the electrode 8 selection period.

When the transmission of the electrode 8 identification information ends after the continuous transmission period (8) during the electrode 8 selection period, the controller 10 turns ON the switching circuit 13 and turns OFF the other switching circuits 14 and 15 by controlling the switching control signals SW1, SW2, and SW3 that are output respectively from terminals P2, P3, and P4 to terminate the electrode 8 selection period and return to the electrode 6 selection period. In step S4, control is exercised from here in the same manner so that the selection periods of the electrodes 6, 7, and 8 are switched sequentially from one to another in a cyclic manner.

As described above, in step S4, an AC signal is ASK-modulated and transmitted from the position pointer 1 to the position detector via the electrodes 6, 7, and 8. The AC signal includes not only identification information of each of the electrodes but also writing pressure data. The position detector receives the AC signal transmitted from the position pointer 1, detects the writing pressure applied to the position pointer 1, and calculates the rotation angle and the tilt angle of the position pointer 1 as will be described later.

After step S4, the controller 10 determines whether or not the writing pressure applied to the position pointer 1 is smaller than the given threshold th0 (step S5). When determining in step S5 that the writing pressure is equal to or larger than the threshold th0, the controller 10 returns to step S4 to repeat the operation in step S4.

On the other hand, when determining in step S5 that the writing pressure is smaller than the threshold th0, the controller 10 determines whether or not the writing pressure has remained so for the given period of time (step S6). Then, when determining in step S6 that the writing pressure has remained so for less than the given period of time, the controller 10 returns to step S4 to repeat the operation in step S4.

When determining in step S6 that the writing pressure has remained so for the given period of time or more, the controller 10 returns to step S3 to transmit the AC signal from the oscillation circuit 12 from all the three electrodes 6, 7, and 8 and repeat the processes from step S3 onward.

<Configuration Example of the Position Detector>

A description will be given next of a configuration example of the position detector according to the first embodiment which is used together with the position pointer 1 described above.

Figure 6:
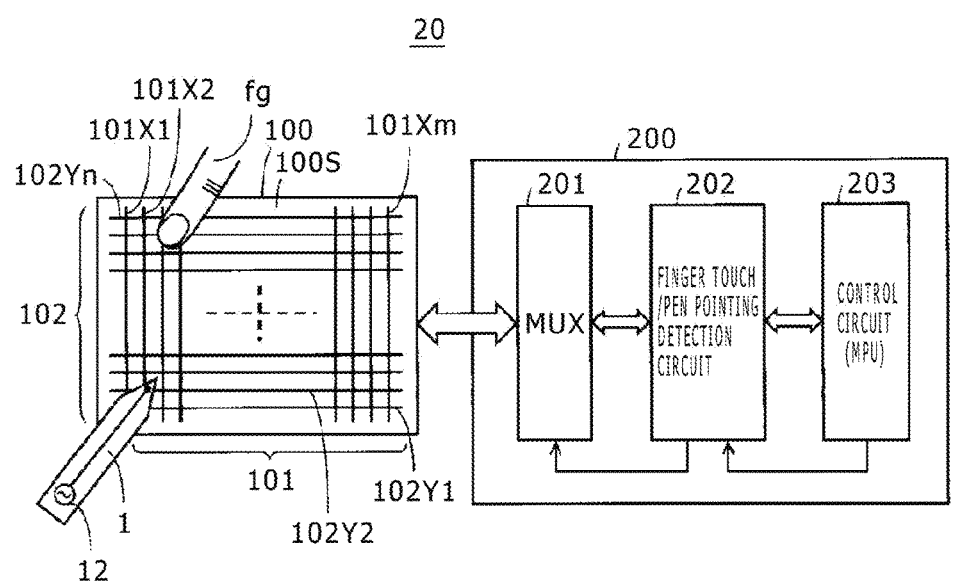
FIG. 6 is a diagram describing a configuration example of the position detector according to the first embodiment of the present invention.

FIG. 6 is a diagram for describing a configuration example of a position detector 20 according to the present embodiment. The position detector 20 in this example is a capacitive position detector which includes a so-called cross-point (mutual capacitance) sensor section. The position detector 20 supplies transmission signals to conductors arranged in a first direction and receives signals from conductors arranged in a second direction different from the first direction when detecting a capacitive touch with a finger or other pointer, and multiple touches, in particular. Further, when the pointer is an active capacitive pen such as the above-described position pointer 1 that includes an electric circuit configured to transmit a position pointing signal and a drive power source configured to drive the electric circuit, the position detector 20 receives signals from the conductors arranged in the first and second directions. It should be noted that the principle behind a cross-point capacitive position detector is described in detail, for example, in Japanese Patent Laid-Open Nos. 2011-3035, 2011-3036, and 2012-123599, the laid-open application publications relating to the applicant of the present application.

The position detector 20 according to the present embodiment includes a sensor section 100 and a control device section 200. The sensor section 100 makes up a touch panel (position detection sensor).

Figure 8:
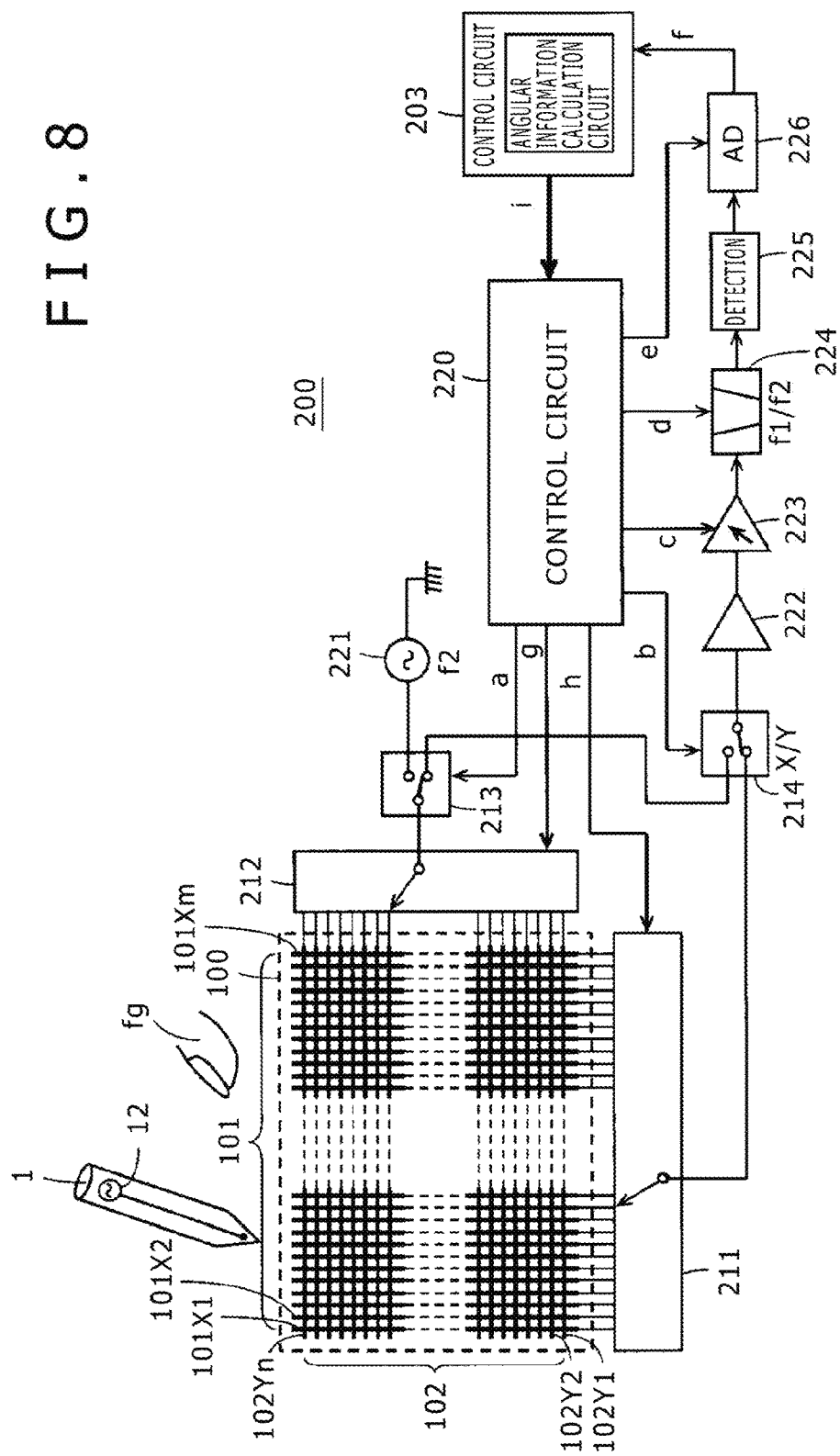
FIG. 8 is a diagram illustrating a circuit configuration example of the position detector according to the first embodiment of the present invention.

The sensor section 100 in this example is formed by stacking, from a lower layer, a Y conductor group 102, an insulating layer, and an X conductor group 101 in this order. The Y conductor group 102 includes, for example, a plurality of Y conductors 102Y1, 102Y2 and so on up to 102Yn (where n is an integer equal to or greater than 1) that extend in the horizontal direction (X-axis direction) and are arranged in parallel with a given spacing therebetween as illustrated in FIG. 6 and FIG. 8 which will be described later. Further, the X conductor group 101 includes a plurality of X conductors 101X1, 101X2 and so on up to 101Xm (where m is an integer equal to or greater than 1) that extend in a direction intersecting the Y conductors 102Y1, 102Y2 and so on up to 102Yn, and, in this example, in the vertical direction (Y-axis direction) orthogonal to the Y conductors 102Y1, 102Y2 and so on up to 102Yn and are arranged in parallel with a given spacing therebetween.

In the sensor section 100 according to the present embodiment, the plurality of X conductors 101X1, 101X2 and so on up to 101Xm making up the X conductor group 101 are first conductors, and the plurality of Y conductors 102Y1, 102Y2 and so on up to 102Yn making up the Y conductor group 102 are second conductors. Thus, the position detector 20 detects a position pointed to by a pointer such as a finger fg or the position pointer 1 making up the active capacitive pen using a sensor pattern formed by the X and Y conductors intersecting each other.

Then, the position detector 20 according to the present embodiment is incorporated in an electronic device such as mobile device called smartphone for use. Therefore, the sensor section 100 is sized to match the sizes of the display screens of electronic devices. A pointing input surface 100S of about four inches in screen size, for example, is formed with the X conductor group 101 and the Y conductor group 102 that are optically transparent.

It should be noted that the X conductor group 101 and the Y conductor group 102 may be arranged on the same side of the sensor board. Alternatively, the X conductor group 101 may be arranged on one side of the sensor board, and the Y conductor group 102 on the other side of the sensor board.

The control device section 200 includes a multiplexer 201, a finger touch/pen pointing detection circuit 202, and a control circuit 203. The multiplexer 201 includes an input/output interface for communication with the sensor section 100.

Figure 7:
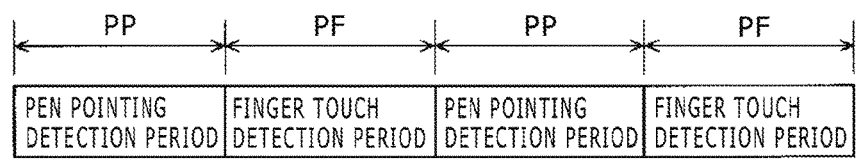
FIG. 7 is a diagram used to describe the processing performed by the position detector according to the first embodiment of the present invention.

The control circuit 203 is designed to control the operation of the position detector 20 as a whole and includes an MPU (microprocessor unit) in this example. The position detector 20 according to the present embodiment is controlled to detect finger touch and pen pointing in a time shared manner. That is, the position detector 20 according to the present embodiment handles a pen pointing detection period PP for detecting pen pointing and a finger touch detection period PF for detecting finger touch alternately in a time shared manner as illustrated in FIG. 7.

In the present embodiment, a signal frequency f2 treated during the finger touch detection period PF is from 50 kHz to 200 kHz and differs significantly in frequency band used from the signal frequency treated during the pen pointing detection period PP (AC signal frequency from the position pointer 1 f1=1.8 MHz). Therefore, the signal treated during the finger touch detection period PF and that treated during the pen pointing detection period PP are separated in band with bandpass filters, thus allowing the two signals to be discriminated one from another.

The control circuit 203 switches between the multiplexer 201 and the finger touch/pen pointing detection circuit 202 as necessary during the finger touch detection period PF and the pen pointing detection period PP as will be described later.

That is, during the finger touch detection period PF, the control device section 200 detects the position touched by the finger by detecting the change in capacitance because each of the intersections of the sensor pattern of the sensor section 100 undergoes a change in capacitance when touched by the finger. The sensor pattern is formed by arranging the X and Y conductors to intersect each other.

That is, during the finger touch detection period PF, the control device section 200 supplies the Y conductors with a transmission signal at the frequency f2 of, for example, about 50 kHz to 200 kHz, and supplies a signal processing circuit with a reception signal from the X conductors. The signal processing circuit detects the positon touched by the finger fg by detecting the change in reception signal level associated with the change in capacitance at the touched position.

Further, the control device section 200 detects the AC signal transmitted from the position pointer 1 with the sensor section 100 during the pen pointing detection period PP. In the position detector 20, the AC signal at the frequency f1 from the position pointer 1 is received not only by the X conductor group 101 (first conductors: X conductors) of the sensor section 100 but also by the Y conductor group 102 (second conductors: Y conductors) as will be described in detail with reference to FIG. 8. Then, the control device section 200 measures the level of the signal at 1.8 MHz transmitted from the position pointer 1 for each of the conductors making up the first and second conductors. The control device section 200 detects the position pointed to by the position pointer 1 on the sensor section 100 by identifying each of the first and second conductors where the 1.8 MHz signal is at the high level.

Then, in the present embodiment, during the pen pointing detection period PP, the control circuit 203 of the control device section 200 receives data of the writing pressure applied to the core body 3 of the position pointer 1, thus detecting not only the writing pressure but also the rotation angle and the tilt angle of the position pointer 1.

<Configuration Example of the Control Device Section 200 of the Position Detector 20>

FIG. 8 illustrates a configuration example of the position detector 20 and primarily shows a configuration example of the control device section 200. That is, the control device section 200 in this example includes an X conductor selection circuit 211, a Y conductor selection circuit 212, switching circuits 213 and 214, an oscillator 221, an amplification circuit 222, a gain control circuit 223, a bandpass filter circuit 224, a detection circuit 225, an analog-digital conversion circuit (will be hereinafter referred to as an AD conversion circuit) 226, a control circuit 220, and the control circuit 203 described earlier as illustrated in FIG. 8.

The X conductor selection circuit 211 configured to select a given X conductor from the X conductor group 101, the Y conductor selection circuit 212 configured to select a given Y conductor from the Y conductor group 102, and the switching circuits 213 and 214 make up the multiplexer 201 described earlier. The oscillator 221, the amplification circuit 222, the gain control circuit 223, the bandpass filter circuit 224, the detection circuit 225, the analog-digital conversion circuit 226, and the control circuit 220 make up the finger touch/pen pointing detection circuit 202 described earlier. The control circuit 220 supplies a switching control signal to the X conductor selection circuit 211, the Y conductor selection circuit 212, and the switching circuits 213 and 214 that make up the multiplexer 201 in response to a control signal i from the control circuit 203. Further, the control circuit 220 supplies a control signal to each of the sections making up the finger touch/pen pointing detection circuit 202 described earlier.

The X conductor selection circuit 211 selects one of the X conductors from the X conductor group 101 in response to a selection control signal h from the control circuit 220. The Y conductor selection circuit 212 selects one of the Y conductors from the Y conductor group 102 in response to a selection control signal g from the control circuit 220.

The oscillator 221 is used to supply the Y conductors making up the Y conductor group 102 with an oscillation signal at the frequency f2 as a drive signal during the finger touch detection period PF of the control device section 200. The switching circuit 213 switches the connection of the Y conductor selected by the Y conductor selection circuit 212 to the oscillator 221 or to the amplification circuit 222 which will be described later.

The control circuit 220 switches the switching circuit 213 with a control signal a during the finger touch detection period PF so that the Y conductor selected by the Y conductor selection circuit 212 is connected to the oscillator 221. The control circuit 220 switches the switching circuit 213 during the pen pointing detection period PP so that the Y conductor selected by the Y conductor selection circuit 212 is connected to the amplification circuit 222.

The switching circuit 214 switches between the X conductor selected by the X conductor selection circuit 211 and the Y conductor selected by the Y conductor selection circuit 212 via the switching circuit 213 for connection to an input end of the amplification circuit 222. During the finger touch detection period PF, the control circuit 220 switches the switching circuit 214 with a control signal b so that the X conductor selected by the X conductor selection circuit 211 is connected to the amplification circuit 222.

Further, when finding the X-axis coordinate of the position pointed to by the position pointer 1 during the pen pointing detection period PP, the control circuit 220 switches the switching circuit 214 with the control signal b so that the X conductor selection circuit 211 is connected to the amplification circuit 222. On the other hand, when finding the Y-axis coordinate of the position pointed to by the position pointer 1, the control circuit 220 switches the switching circuit 214 with the control signal b so that the Y conductor selection circuit 212 is connected to the amplification circuit 222.

The output of the amplification circuit 222 is connected to the gain control circuit 223. The gain control circuit 223 controls the gain of the output of the amplification circuit 222 with a control signal c from the control circuit 223, thus providing an output signal at an appropriate level.

The bandpass filter circuit 224 has a given bandwidth centered around the frequencies f1 and f2. The center frequency of the bandpass filter circuit 224 is switched by a control signal d from the control circuit 220. The center frequency is set to f2 during the finger touch detection period PF and to f1 during the pen pointing detection period PP.

The output signal of the bandpass filter circuit 224 is detected by the detection circuit 225. The detection output thereof is supplied to the AD conversion circuit 226 and converted to a digital value by the AD conversion circuit 226 based on a control signal e from the control circuit 220. Digital data f from the AD conversion circuit 226 is read by the control circuit 203 which performs signal processing to find the coordinates of the position pointed to by the position pointer 1 on the sensor section 100, the rotation angle of the position pointer 1, and the tilt angle of the position pointer 1 relative to the sensor surface 100S of the sensor section 100.

The microprocessor making up the control circuit 203 incorporates a ROM and a RAM and operates in accordance with a program stored in the ROM. Then, the control circuit 203 outputs the control signal i, thus controlling the control circuit 220 to output the control signals a to e, g and h at given times.

A description will be given below of the operation of the position detector 20 configured as described above during the finger touch detection period PF. As described earlier, the switching circuit 213 is connected to the oscillator 221 during the finger touch detection period PF, thus causing a drive signal to be supplied to the Y conductor selected by the Y conductor selection circuit 212. Further, the X conductor selected by the X conductor selection circuit 211 is connected to the amplification circuit 222 via the switching circuit 214. The signal level from the amplification circuit 222 is supplied to the AD conversion circuit 226 via the gain control circuit 223, the bandpass filter circuit 224, and the detection circuit 225 and converted by the AD conversion circuit 226 into a digital value.

At this time, if the intersection between the X and Y conductors selected respectively by the X conductor selection circuit 211 and the Y conductor selection circuit 212 is touched by a finger, the detected signal level is lower than that in the absence of a finger. Therefore, by finding in advance the signal level of each of the intersections between the X conductors making up the X conductor group 101 and the Y conductors making up the Y conductor group 102 in the absence of a finger, it is possible to find the position touched by the finger from the position where the signal level declines.

A description will be given next of the operation of the position detector 20 when the position detector 20 detects the position pointed to by the position pointer 1 and the rotation angle and the tilt angle of the position pointer 1 during the pen pointing detection period PP.

Based on the control signal i from the control circuit 203, the control circuit 220 switches the switching circuit 213 with the control signal a so that the Y conductor selected by the Y conductor selection circuit 212 is connected to the amplification circuit 222 via the switching circuit 214. Further, the control circuit 220 switches the switching circuit 214 with the control signal b so that the X conductor selected by the X conductor selection circuit 211 is connected to the amplification circuit 222. It should be noted that when the X conductor selected by the X conductor selection circuit 211 is connected to the amplification circuit 222, the Y conductor selected by the Y conductor selection circuit 212 is connected neither to the amplification circuit 222 nor to the oscillator 221.

Next, the control circuit 203 causes the control circuit 220 to output the control signal h to the X conductor selection circuit 211 so that an X conductor 101X1 is selected. This is done to scan the X conductors so as to find the position pointed to by the position pointer 1 in the X direction. The control circuit 203 reads the digital data f from the AD conversion circuit 226, the signal level at this time. Then, thanks to instructions issued from the control circuit 203 to the control circuit 220, the X conductor selection circuit 211 sequentially switches between X conductors, switching from an X conductor 101X2 to an X conductor 101X3, to an X conductor 101X4, and so on and reading the digital data f of each of the signal levels from the AD conversion circuit 226.

At this time, if none of the signal levels detected from all the X conductors 101X1 to 101Xm has reached a given value, the control circuit 203 determines that the position pointer 1 is not on the sensor section 100, thus repeating the above operation. When a signal level equal to or higher than the given value is detected from any of the X conductors 101X1 to 101Xm, the control circuit 203 stores 101Xi, the number of the X conductor from which the highest signal level has been detected, by determining that the position pointer 1 is located close to the X conductor 101Xi.

Next, the control circuit 203 causes the control circuit 220 to output the control signal g to the Y conductor selection circuit 212 so that a Y conductor 102Y1 is selected. This is done to scan the Y conductors so as to find the position pointed to by the position pointer 1 in the Y direction. Then, the control circuit 203 finds the position pointed to by the position pointer 1 in the Y direction on the sensor section 100 by performing a process similar to that for finding the position in the X direction as described above.

Figure 9:
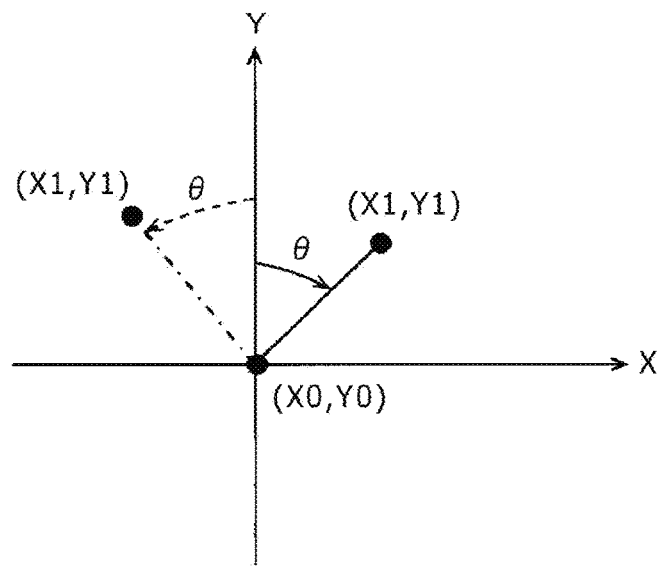
FIG. 9 is a diagram used to describe the processing performed by the position detector according to the first embodiment of the present invention for measuring the rotation angle of the position pointer.

FIG. 9 is a principle diagram for calculating a rotation angle θ of the position pointer 1 about the axis perpendicular to the sensor surface 100S when two sets of coordinates (X0, Y0) and (X1, Y1) are available. In FIG. 9, θ has a range of −180°<θ≤180° with the normal direction of the Y axis serving as a reference (θ=0) so as to define the orientation of the electrode 6 corresponding to the coordinates (X1, Y1). At this time, the rotation angle θ of the position pointer 1 is calculated from X0, Y0, X1, and Y1 as shown in the following formulas (1) to (5).

[Formulas 1]

When $Y1 > Y0$ $$\theta = \tan^{-1}\left(\frac{X1 - X0}{Y1 - Y0}\right) \quad (1)$$

When $Y1 = Y0$ and $X1 > X0$ $$\theta = 90° \quad (2)$$

When $Y1 = Y0$ and $X1 < X0$ $$\theta = -90° \quad (3)$$

When $Y1 < Y0$ and $X1 \geq X0$ $$\theta = 180° + \tan^{-1}\left(\frac{X1 - X0}{Y1 - Y0}\right) \quad (4)$$

When $Y1 < Y0$ and $X1 < X0$ $$\theta = -180° + \tan^{-1}\left(\frac{X1 - X0}{Y1 - Y0}\right) \quad (5)$$

Then, in the present embodiment, the tilt angle of the position pointer 1 is found from each of the reception signal intensities obtained by receiving the AC signals transmitted from the three electrodes 6, 7, and 8 of the position pointer 1. Both the signal level at the time of detection of the X axis coordinate and that at the time of detection of the Y axis coordinate may be used as a reception signal intensity. Here, the signal level at the time of detection of the X axis coordinate is used.

Figure 10:
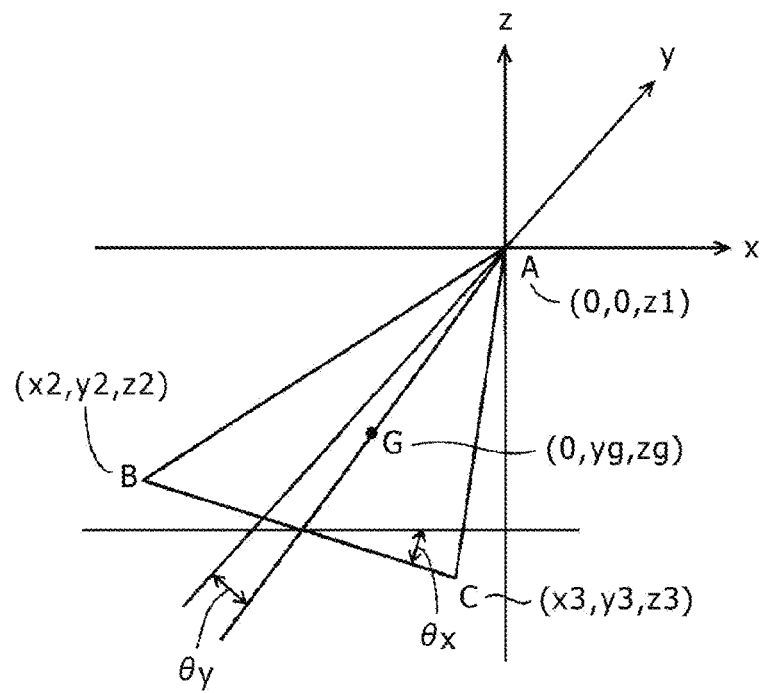
FIG. 10 is a diagram used to describe the processing performed by the position detector according to the first embodiment of the present invention for measuring the tilt angle of the position pointer.

FIG. 10 is a principle diagram for calculating the tilt angle of the position pointer 1 using reception signal intensities V1, V2, and V3 obtained by receiving the AC signals transmitted from the three electrodes 6, 7, and 8. In FIG. 10, the height direction from the sensor surface 100S of the position detector 20 is taken as the z axis. The points corresponding to the tips of the electrodes 6, 7, and 8 of the position pointer 1 are denoted respectively as A, B, and C. The coordinate axes are established so that a center G of the equilateral triangle made up of the points A, B, and C is located on a yz plane, and so that the point A corresponding to the tip of the electrode 6 is located on the z axis. When the coordinates of the points A, B, C, and G at this time are represented respectively as (0, 0, z1), (x2, y2, z2), (x3, y3, z3), and (0, yg, zg), the tilt angle (θx, θy) of the position pointer 1 can be found as shown in the following formulas (6) and (7).

[Formulas 2]

$$\sin \theta x = \frac{z2 - z3}{r} \quad (r: \text{length of one side of the equilateral triangle}) \quad (6)$$

$$\sin \theta y = \frac{2 \cdot z1 - z2 - z3}{r\sqrt{3}} \quad (7)$$

(Tilt of the Median Between Point A and Line BC)

Here, distances (z1, z2, z3) between points A, B, and C, the tip positions of the three electrodes 6, 7, and 8 of the position pointer 1, and the sensor surface 100S are approximately inversely proportional to the reception signal intensities V1, V2, and V3. Therefore, α is denoted as a proportional factor as shown in the following formulas (8) and (9).

[Formulas 3]

$$z1 = \alpha/V1, \; z2 = \alpha/V2, \; z3 = \alpha/V3$$

Hence, $\theta x$ and $\theta y$ are $$\theta x = \sin^{-1} \frac{\alpha(V3 - V2)}{r \cdot V2 \cdot V3} \quad (8)$$

$$\theta y = \sin^{-1} \frac{\alpha(2 \cdot V2 \cdot V3 - V1 \cdot V3 - V1 \cdot V2)}{r \cdot V1 \cdot V2 \cdot V3 \cdot \sqrt{3}} \quad (9)$$

Here, α/r is a constant. Therefore, it is possible to find θx and θy from the above relational formulas by finding α/r in advance.

It should be noted that although, in the first embodiment described above, the electrodes 6, 7, and 8 configured to transmit AC signals are provided on the outer perimeter surface of the housing 2, these electrodes may be formed on the inner perimeter wall surface of the housing 2.

Second Embodiment

In the position pointer 1 according to the first embodiment described above, the electrodes 6, 7, and 8 are switched from one to another with the switching circuits 13 to 15 to supply the AC signal from the oscillation circuit 12. In the position pointer 1 according to the first embodiment, therefore, the switching circuits 13 to 15 control the switching of the AC signal itself. As a result, it is necessary for the switching circuits 13 to 15 to have high voltage resistance so as to handle an AC signal with a large amplitude. A second embodiment is an example that provides improvement to this problem.

Figure 11A:
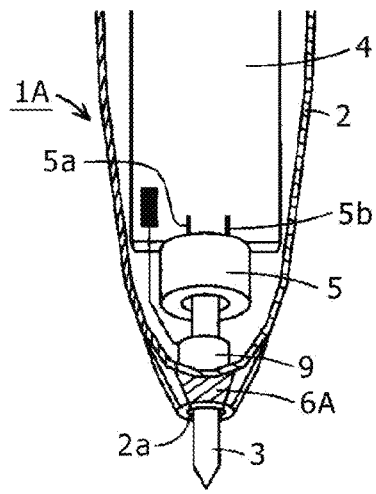
FIGS. 11A and 11B are diagrams illustrating a configuration example of major components of a position pointer of a position detector according to a second embodiment of the present invention.
Figure 11B:
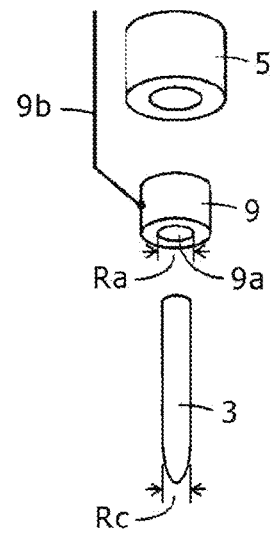

FIGS. 11A and 11B are diagrams illustrating the structure of a position pointing section (core body side) of a position pointer 1A of the position detector according to a second embodiment of the present invention. The same components as those of the position pointer 1 of the position detector according to the first embodiment are denoted by the same reference symbols. It should be noted that the configuration of the position detector 20 according to the second embodiment is completely the same as that according to the first embodiment.

The position pointer 1A according to the second embodiment uses a tubular electrode 9 as an electrode configured to transmit an AC signal as illustrated in FIGS. 11A and 11B. The electrode 9 is disposed in the housing 2 in such a manner as to be axially aligned with the housing 2. The tubular electrode 9 has a through hole 9a having a diameter that permits insertion of the core body 3. That is, letting the outer diameter of the core body 3 be denoted by Rc, an internal diameter Ra of the electrode 9 is Rc<Ra. The electrode 9 may be made of a metallic conductor, a conductive resin, or other conductive material. The electrode 9 is electrically connected to the circuit section of the printed circuit board 4 by a wire 9b and is supplied with an AC signal as will be described later. The tubular electrode 9 will be hereinafter referred to as the signal electrode 9.

The end portion of the core body 3 on the opposite side of the tip portion thereof is inserted into the signal electrode 9 and coupled to the coupling section of the variable capacitor 5 in an insertable and withdrawable manner as with the position pointer 1 according to the first embodiment. Similarly in the second embodiment, therefore, the core body 3 can be inserted into and withdrawn from the position pointer 1A, thus making the core body 3 replaceable.

Then, similarly in the position pointer 1A according to the second embodiment, at least the position pointing section side of the housing 2 of the position pointer 1A is made of an insulating material such as resin. Three electrodes 6A, 7A, and 8A are circumferentially formed on the area in the shape of a truncated cone near the opening 2a of the housing 2 in such a manner as to axially surround the housing 2. The electrodes 6A, 7A, and 8A are electrically isolated from each other.

The three electrodes 6A, 7A, and 8A are made of the same material and formed in the same shape as the three electrodes 6, 7, and 8 of the position pointer 1 according to the first embodiment. In the present embodiment, however, the electrodes 6A, 7A, and 8A are formed, in particular, to surround a signal transmission path from the tubular electrode 9. Then, similarly in the second embodiment, each of the electrodes 6A, 7A, and 8A is electrically connected to the printed circuit board 4 by a wire that is not shown. Each of the electrodes 6A, 7A, and 8A is connected to a given potential, and to the ground potential in this example, via a switching circuit 31, as will be described later. The electrodes 6A, 7A, and 8A function in such a manner that when the ground potential is applied to one of the electrodes 6A, 7A, and 8A, the AC signal from the electrode applied with the ground potential is inhibited as will be described later. Each of the electrodes 6A, 7A, and 8A will be hereinafter referred to as the inhibiting electrode.

Figure 12A:
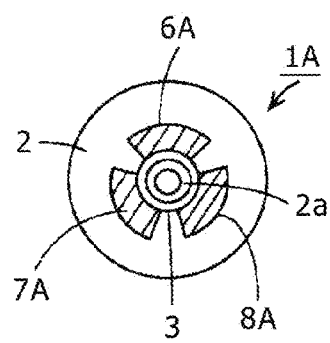
FIGS. 12A to 12C are diagrams illustrating a configuration example of major components of the position pointer of the position detector according to the second embodiment of the present invention.

FIG. 12A illustrates the position pointer 1A as seen from the tip of the core body 3. Similarly in the second embodiment, the three inhibiting electrodes 6A, 7A, and 8A are formed to surround the core body 3.

Figure 12B:
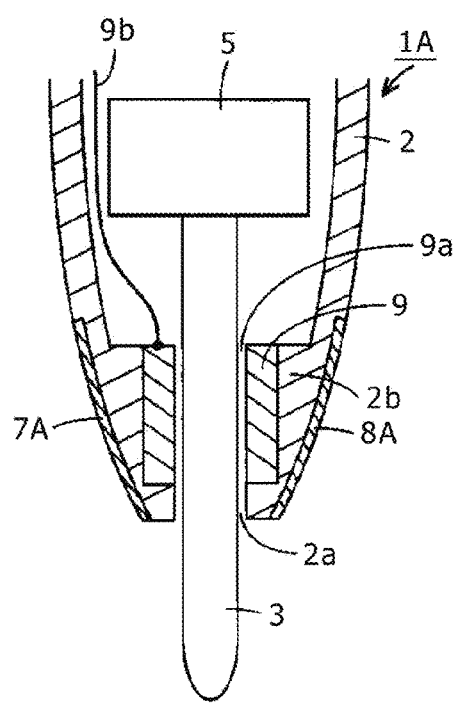

As shown in the sectional view of the position pointer 1A in FIG. 12B, the tubular electrode 9 is disposed in the housing 2 in such a manner as to be fitted into a stepped portion 2b provided on the side of the opening 2a. The tubular electrode 9 is fastened to the inner wall surface of the housing 2, for example, by bonding. As illustrated in FIG. 12B, the through hole 9a of the signal electrode 9 communicates with the opening 2a of the housing 2. The core body 3 is inserted into the signal electrode 9 and coupled to the variable capacitor 5 in an insertable and withdrawable manner as described earlier.

Figure 12C:
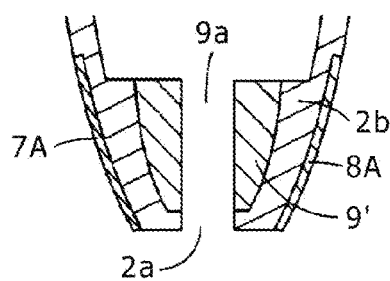

It should be noted that the signal electrode 9 may be shaped to become narrower with a gradual decline in outer diameter of the tubular body as illustrated as a signal electrode 9' in FIG. 12C to match the shape of the housing 2 that becomes narrower toward the opening 2a. In this case, the stepped portion 2b formed in the housing 2 includes an inner wall surface shaped to match the outer shape of the tubular body of the signal electrode 9' shown in FIG. 12C.

Figure 13:
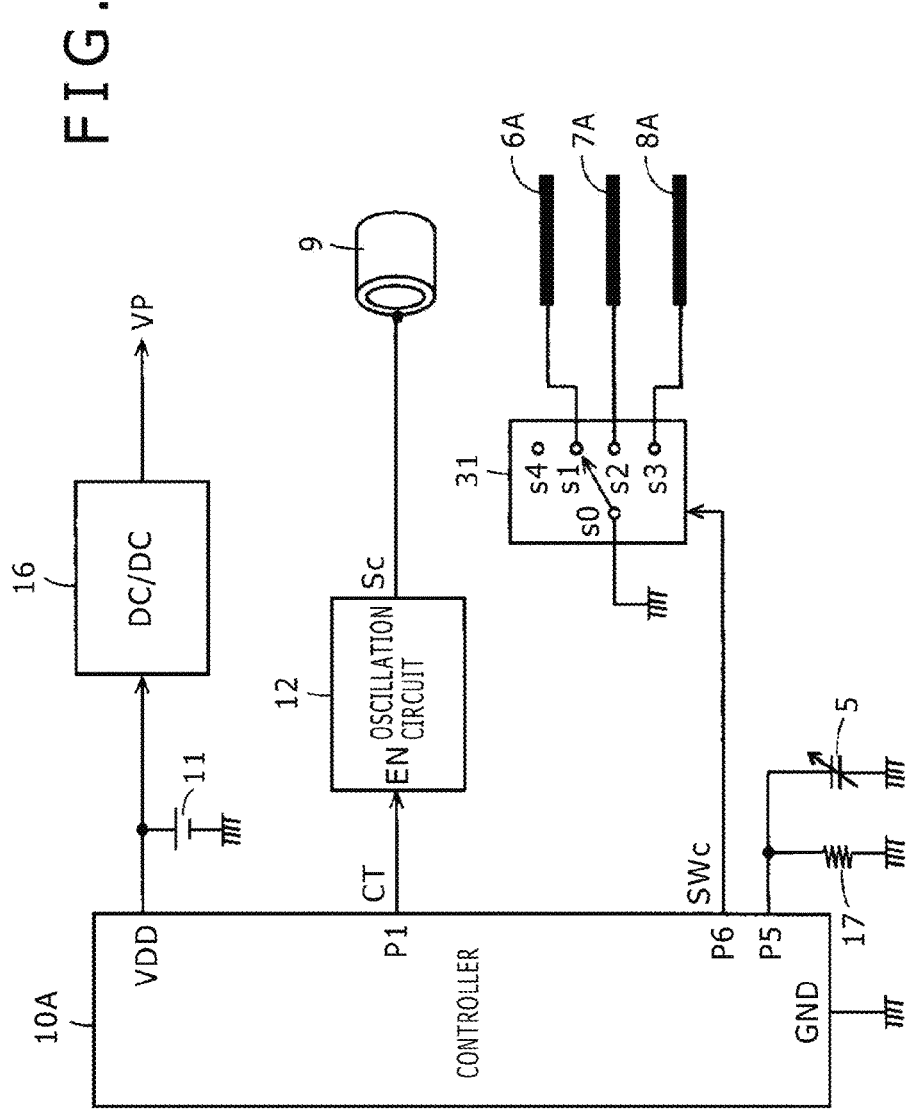
FIG. 13 is a diagram illustrating an example of an internal circuit configuration of the position pointer of the position detector according to the second embodiment of the present invention.

FIG. 13 is a circuit configuration diagram of the position pointer 1A according to the second embodiment. The same circuit components as those of the position pointer 1 according to the first embodiment shown in FIG. 3 are denoted by the same reference symbols. That is, the position pointer 1A includes a controller 10A, the battery 11, the oscillation circuit 12, and the switching circuit 31. Then, the variable capacitor 5 and the resistor 17 are connected to the controller 10A.

The controller 10A includes, for example, a microprocessor and makes up a control circuit configured to control processing of the position pointer 1A. A drive voltage is supplied to the controller 10A from the battery 11 serving as a drive power source. The controller 10A not only controls the oscillation circuit 12 and the switching circuit 31 to turn ON or OFF but also detects the writing pressure applied via the core body 3 of the position pointer 1A by monitoring the capacitance of the variable capacitor 5.

The switching circuit 31 switches one of the inhibiting electrodes 6A, 7A, and 8A to the ground potential. That is, the switching circuit 31 has a movable terminal s0 connected to the ground end, a first terminal s1 connected to the inhibiting electrode 6A, a second terminal s2 connected to the inhibiting electrode 7A, and a third terminal s3 connected to the inhibiting electrode 8A. Then, in this example, the switching circuit 31 includes a free end s4 that does not apply the ground potential to any of the inhibiting electrodes 6A, 7A, and 8A. The switching circuit 31 is switched from one terminal to another by a switching control signal SWc from the controller 10A.

The oscillation circuit 12 generates an AC signal at the frequency f1 in completely the same manner as in the first embodiment. Then, the controller 10A supplies the same enable signal CT as supplied by the controller 10 according to the first embodiment to the oscillation circuit 12.

In the position pointer 1A according to the second embodiment, the switching circuit 31 switches the connection to the ground potential between the inhibiting electrodes 6A, 7A, and 8A rather than switching the AC signal from the oscillation circuit 12. Therefore, there is no need to use a switching circuit that has high voltage resistance such as the switching circuits 13, 14, and 15.

Figure 5:
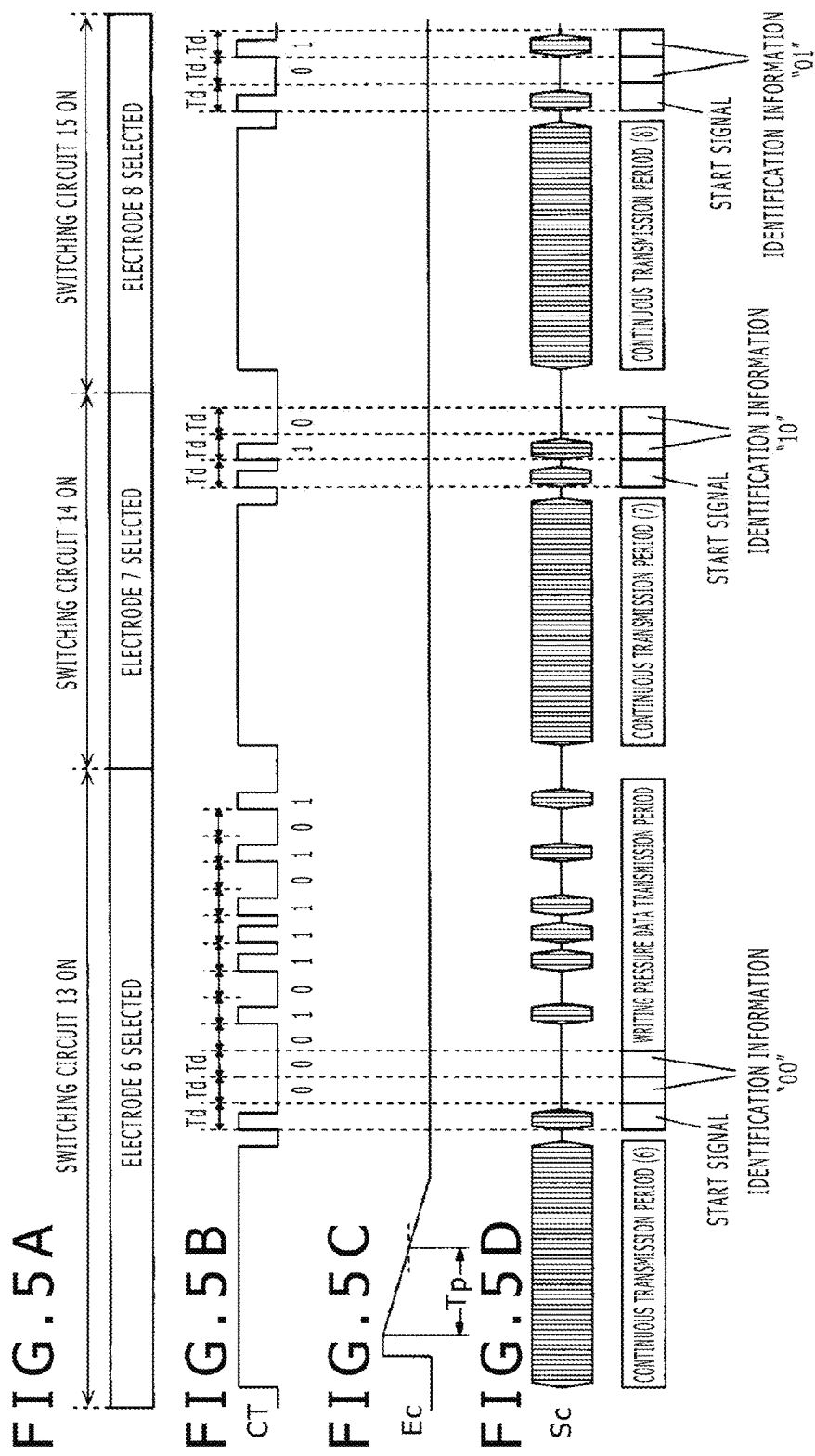
FIGS. 5A to 5D are diagrams illustrating timing charts for describing an example of processing performed by the position pointer of the position detector according to the first embodiment of the present invention.

In the second embodiment, when the position pointer 1A is not in contact with the sensor section 100 of the position detector 20, the controller 10A repeatedly alternates between the continuous transmission period in which the AC signal is continuously transmitted from the oscillation circuit 12 and the transmission period in which writing pressure data is transmitted in the form of an ASK modulated signal in the same manner as shown in the timing charts of FIG. 5. At this time, the controller 10A switches the switching circuit 31 to the free end s4. This ensures that the AC signal can be transmitted from the signal electrode 9 of the position pointer 1A without the transmission being inhibited by the inhibiting electrodes 6A, 7A, and 8A. Therefore, when the position pointer 1A is not close to or in contact with the sensor section 100, the AC signal is transmitted at the maximum signal intensity as in the first embodiment.

Figures 14A, 14B, 14C, 14D:
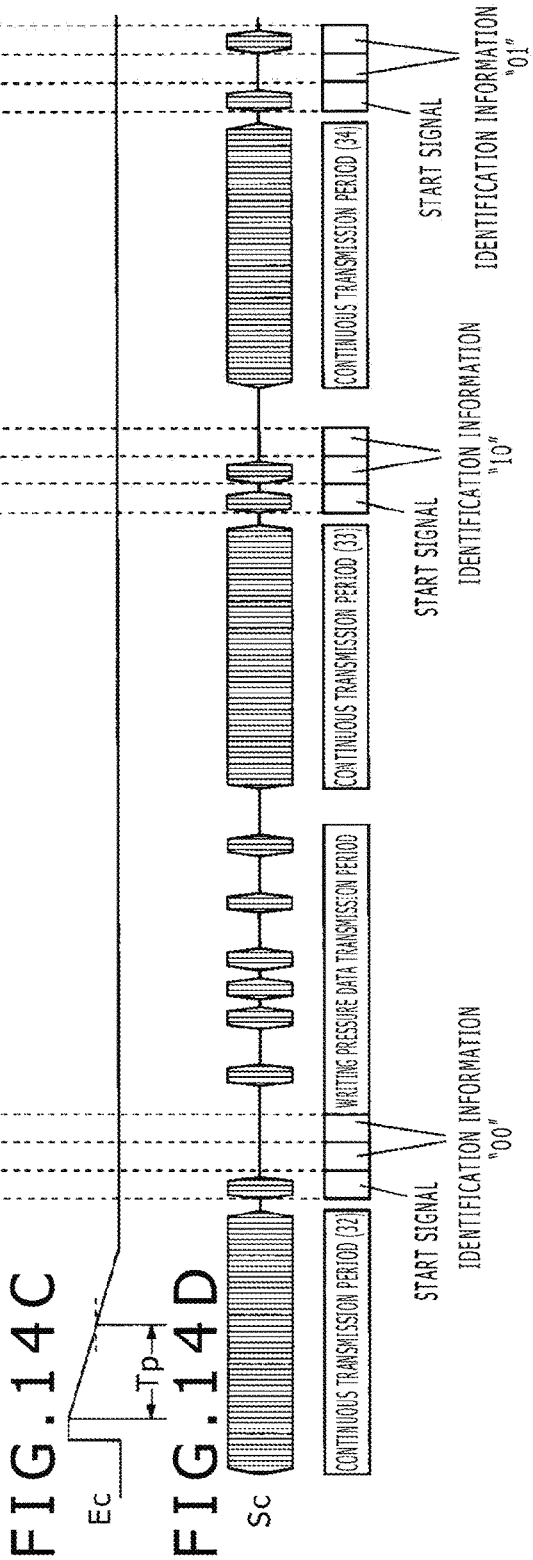
FIGS. 14A to 14D are diagrams illustrating timing charts for describing an example of processing performed by the position pointer of the position detector according to the second embodiment of the present invention.

When a given writing pressure is applied to the core body 3 as a result of the position pointer 1A coming in contact with the sensor section 100, the controller 10A detects the change in the writing pressure based on the capacitance of the variable capacitor 5, thus switching the switching circuit 31 from one of the three inhibiting electrodes 6A, 7A, and 8A to another to the ground potential as illustrated in FIG. 14A, generating the enable signal CT (refer to FIG. 14B; same as FIG. 5B) configured to control the enabling of the oscillation circuit 12 in step with the switching of the switching circuit 31, and supplying the enable signal CT to the oscillation circuit 12.

Figure 15A:
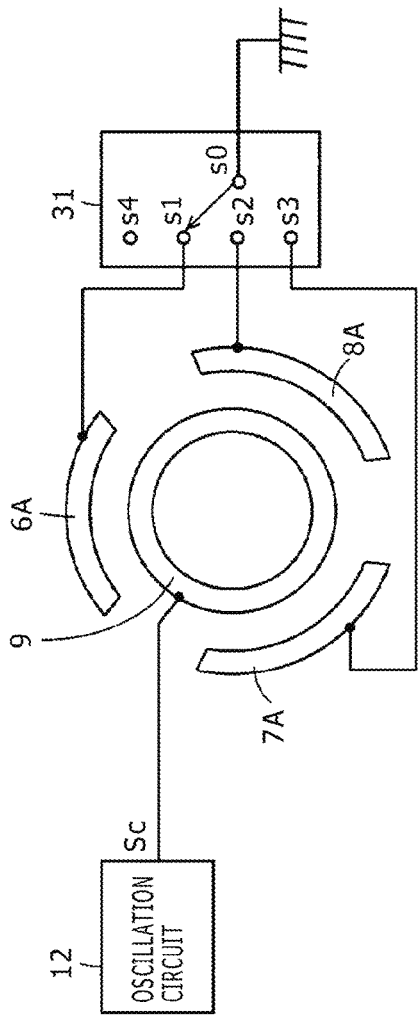
FIGS. 15A to 15D are diagrams for describing an example of processing performed by the position pointer of the position detector according to the second embodiment of the present invention.
Figure 15D:
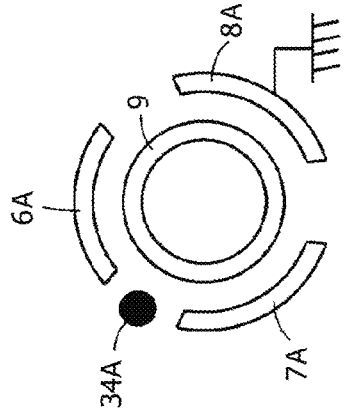
Figure 15C:
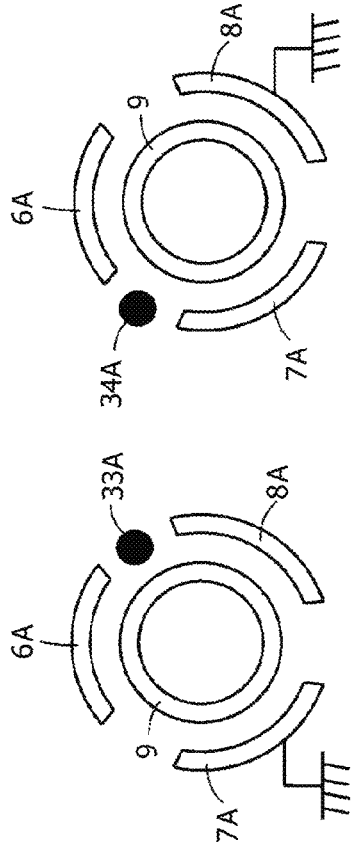
Figure 15B:
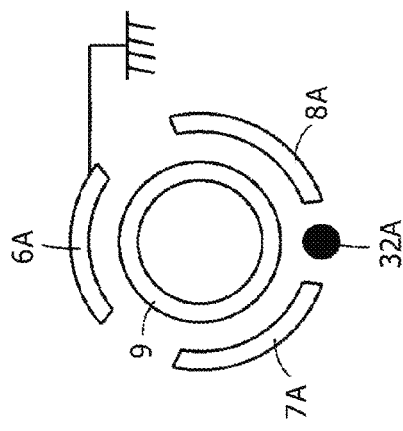

FIGS. 15A to 15D are diagrams for describing the relationship between switching between the inhibiting electrodes 6A, 7A, and 8A at this time and the AC signal transmission position of the signal electrode 9. That is, when the switching circuit 31 is connected to the terminal s1 in FIG. 15A, the inhibiting electrode 6A assumes the ground potential as shown in FIG. 15B, thus inhibiting the transmission of the AC signal from the signal electrode 9 from the inhibiting electrode 6A. As a result, the AC signal from the signal electrode 9 is transmitted at the highest signal level at a black round mark 32A between the inhibiting electrodes 7A and 8A in FIG. 15B.

At this time, the controller 10A controls the AC signal Sc as shown in FIG. 14D by transmitting the enable signal CT as shown in FIG. 14B to the oscillation circuit 12, thus transmitting signals in such a manner as to generate a continuous transmission period (32), a start signal, identification information following the start signal, and a writing pressure data transmission period following the identification information. In this example, identification information is "00" indicating that the inhibiting electrode 6A has been selected.

Next, the switching circuit 31 is switched over to the terminal s2, thus connecting the inhibiting electrode 7A to the ground potential and inhibiting the transmission of the AC signal from the signal electrode 9 from near the inhibiting electrode 7A as shown in FIG. 15C. As a result, the AC signal from the signal electrode 9 is transmitted at the highest signal level at a black round mark 33A between the inhibiting electrodes 6A and 8A in FIG. 15C.

At this time, the controller 10A controls the AC signal Sc as shown in FIG. 14D by transmitting the enable signal CT as shown in FIG. 14B to the oscillation circuit 12, thus transmitting signals in such a manner as to generate a continuous transmission period (33), a start signal, and identification information following the start signal. In this example, identification information is "10" indicating that the inhibiting electrode 7A has been selected.

Next, the switching circuit 31 is switched over to the terminal s3, thus connecting the inhibiting electrode 8A to the ground potential and inhibiting the transmission of the AC signal from the signal electrode 9 from the inhibiting electrode 8A as shown in FIG. 15D. As a result, the AC signal from the signal electrode 9 is transmitted at the highest signal level at a black round mark 34A between the inhibiting electrodes 6A and 7A in FIG. 15D.

At this time, the controller 10A controls the AC signal Sc as shown in FIG. 14D by transmitting the enable signal CT as shown in FIG. 14B to the oscillation circuit 12, thus transmitting signals in such a manner as to generate a continuous transmission period (34), a start signal, and identification information following the start signal. In this example, identification information is "01" indicating that the inhibiting electrode 8A has been selected.

Similarly in this second embodiment, it is possible to detect the coordinates of the position pointed to by the position pointer 1A and the rotation angle and the tilt angle of the position pointer 1A as in the first embodiment. However, the second embodiment differs from the first embodiment in that the sets of coordinates (X1, Y1), (X2, Y2), and (X3, Y3) correspond to the positions of the black round marks 32A, 33A, and 34A in the second embodiment rather than those of the electrodes 6, 7, and 8 in the first embodiment.

Then, similarly in the second embodiment, it is possible to identify the transmission position of the AC signal from the position pointer 1A by identifying each of the inhibiting electrodes 6A, 7A, and 8A, thus allowing to positively obtain the rotation angle and the tilt angle of the position pointer 1A.

Moreover, in the second embodiment, no AC signal is supplied to the switching circuit 31, which is not the case with the first embodiment. As a result, it is not necessary to use a switching circuit that has high voltage resistance, thus making the second embodiment advantageous in terms of cost.

Modified Example of the Second Embodiment

In the second embodiment, the inhibiting electrodes 6A, 7A, and 8A configured to inhibit the transmission of the AC signal are provided on the outer perimeter surface of the housing 2. However, these electrodes may be provided on the inner wall surface of the housing 2.

Further, in the second embodiment, the signal electrode 9 is made of a tubular conductor. The signal electrode 9 is disposed in the housing 2 in such a manner as to be axially aligned with the housing 2. The inhibiting electrodes 6A, 7A, and 8A are formed to surround a given axial position of the housing 2 of the position pointer 1A at the tip portion of the housing 2 so that the AC signal from the signal electrode 9 is inhibited. However, the configuration for inhibiting the AC signal from the position pointer is not limited to the above example.

Figure 16A:
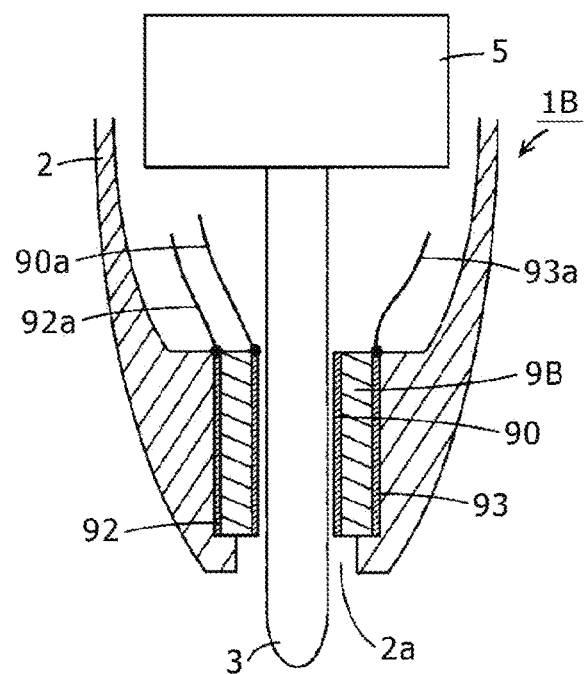
FIGS. 16A and 16B are diagrams illustrating a configuration example of major components of a modified example of the position pointer of the position detector according to the second embodiment of the present invention.
Figure 16B:
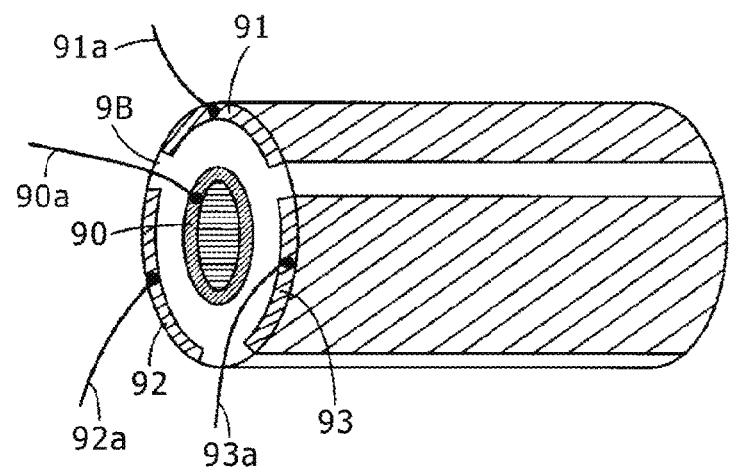

FIGS. 16A and 16B are diagrams for describing another configuration example of the signal electrode and the inhibiting electrodes in the position pointer according to the second embodiment. Similarly in the example shown in FIGS. 16A and 16B, the same components as those in the first embodiment are denoted by the same reference symbols. FIG. 16A is a partial sectional view illustrating a configuration example of a position pointer 1B in this example on the side of the core body 3. FIG. 16B illustrates a tubular body 9B that includes a signal electrode 90 and inhibiting electrodes 91, 92, and 93.

The position pointer 1B in the example shown in FIGS. 16A and 16B is formed, for example, by printing or vapor-depositing a conductive material on the hollow inner wall of the tubular body 9B that is made of an insulating material such as resin so as to form the signal electrode 90. Then, the signal electrode 90 and the printed circuit board 4 (not shown) are connected by a wire 90a.

On the outer perimeter surface of the tubular body 9B, on the other hand, the three inhibiting electrodes 91, 92, and 93 are formed in such a manner as to be electrically isolated from each other, with each electrode spanning an angular range of slightly less than 120 degrees, as illustrated in FIG. 16B. These electrodes 91, 92, and 93 may be formed, for example, by printing or vapor-depositing a conductive material. Alternatively, these electrodes 91, 92, and 93 may be formed by lamination or bonding. The inhibiting electrodes 91, 92, and 93 are connected to the printed circuit board 4 respectively via wires 91a, 92a, and 93a.

The circuit configuration of the position pointer 1B in the example shown in FIGS. 16A and 16B may be exactly the same as that of the position pointer 1A shown in FIG. 13. Then, it is possible to detect the position pointed to by the position pointer 1B, the writing pressure applied thereto, and the rotation angle and the tilt angle thereof in exactly the same manner as for the position pointer 1A as described with reference to FIGS. 14A to 15D.

Third Embodiment

FIGS. 17A to 17E are diagrams for describing a position pointer 1C of the position detector according to a third embodiment. The position pointer 1C according to the third embodiment is a modified example of the first embodiment. The position pointer 1C is also a configuration example using, as a pressure detection sensor configured to detect the writing pressure, a writing pressure detection module that includes a semiconductor chip. The semiconductor chip makes up a capacitive pressure sensing section. Similarly in the example shown in FIGS. 17A to 17E, the same components as those of the position pointer 1 according to the first embodiment are denoted by the same reference symbols, and the detailed description thereof is omitted.

Figure 17A:
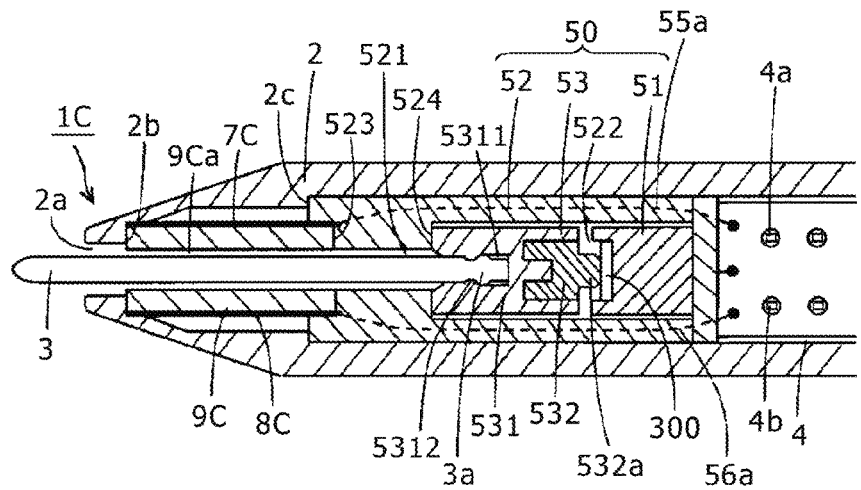
FIGS. 17A to 17E are diagrams illustrating a configuration example of major components of a position pointer of a position detector according to a third embodiment of the present invention.
Figure 17B:
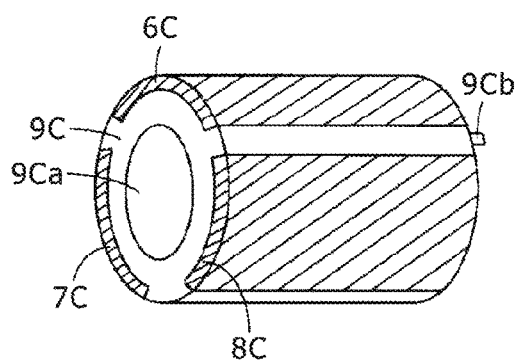

FIG. 17A is a sectional view for describing the configuration of the position pointer 1C on the side of the core body 3. In the first embodiment, the electrodes 6, 7, and 8 configured to transmit the AC signal are provided on the outer perimeter portion of the housing 2. In the position pointer 1C according to the third embodiment, on the other hand, three electrodes 6C, 7C, and 8C are provided on the outer perimeter surface of a tubular body 9C that is arranged inside the housing 2 as illustrated in FIG. 17B. The tubular body 9C is arranged inside the housing 2 in such a manner as to be axially aligned with the housing 2 as illustrated in FIG. 17A. Then, the tubular body 9C has a through hole 9Ca having a diameter that permits insertion of the core body 3.

The electrodes 6C, 7C, and 8C are formed on the outer perimeter surface of the tubular body 9C in such a manner as to be electrically isolated from each other, with each electrode spanning an angular range of slightly less than 120 degrees, as illustrated in FIG. 17B.

Then, in the position pointer 1C according to the third embodiment, a writing pressure detection module 50 is provided in the housing 2 and coupled to the end portion of the core body 3 on the opposite side of the tip portion thereof.

The writing pressure detection module 50 includes a pressure sensing device 51, an outer holder 52 serving as a first holder, and an inner holder 53 serving as a second holder. The outer holder 52 is made of a hard resin such as POM (polyoxymethylene; polyacetal) or polycarbonate.

The outer holder 52 has a through hole 521 and a storage space 522. The through hole 521 penetrates the core body 3. The storage space 522 is a hollow portion that communicates with the through hole 521. The inner holder 53 and the pressure sensing device 51 are accommodated in the storage space 522. Further, a recessed portion 523 shaped to match the shape of the tubular body 9C is provided on the end face of the outer holder 52 on the side of the core body 3. The tubular body 9C is fitted into the recessed portion 523 for coupling.

Figure 17C:
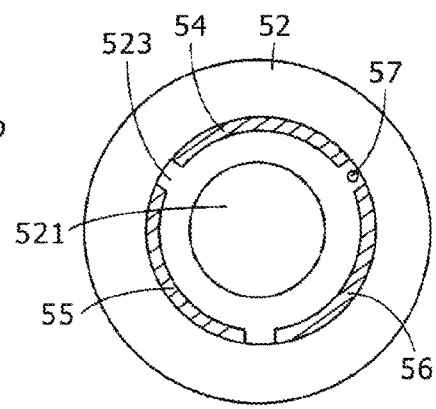

Conductor pieces 54, 55, and 56 are formed on the inner perimeter surface of the recessed portion 523 on the bottom surface side as illustrated in FIG. 17C. The conductor pieces 54, 55, and 56 are associated respectively with the three electrodes 6C, 7C, and 8C that are formed on the outer perimeter surface of the tubular body 9C. Further, a positioning protrusion 9Cb is formed on the tubular body 9C. Still further, a recessed hole 57 for the protrusion 9Cb is formed on the bottom surface of the recessed portion 523 as illustrated in FIG. 17C. Then, the protrusion 9Cb is fitted into the recessed hole 57 for circumferential positioning, and then the tubular body 9C is placed in the recessed portion 523. As a result, the three electrodes 6C, 7C, and 8C formed on the outer perimeter surface of the tubular body 9C are electrically connected to the associated conductor pieces 54, 55, and 56 on the recessed portion 523, respectively, because each of the electrodes 6C, 7C, and 8C is configured to come in contact with the associated conductor piece.

Then, as illustrated in FIG. 17A, wires 54a (not shown), 55a, and 56a (refer to the dotted lines in FIG. 17A) are provided in the outer holder 52 made of a resin. The wires 54a, 55a, and 56a are formed by insert molding, and one ends of the wires 54a, 55a, and 56a are connected to the conductor pieces 54, 55, and 56, respectively. The other ends of the wires 54a, 55a, and 56a are connected to the printed circuit board 4. As a result, when the tubular body 9C is fitted into the recessed portion 523 for storage, the three electrodes 6C, 7C, and 8C formed on the outer perimeter surface of the tubular body 9C are connected to the printed circuit board 4 via the conductor pieces 54, 55, and 56 and the wires 54a, 55a, and 56a.

The outer holder 52 on the side of the core body 3 in the axial direction abuts against a stepped portion 2c of the housing 2 as illustrated in FIG. 17A. Further, the outer holder 52 on the opposite side of the core body 3 abuts against axial position restricting means. Therefore, the outer holder 52 is fastened in such a manner as to be prevented from moving axially inside the housing 2.

The side of the storage space 522 of the outer holder 52 into which the core body 3 is inserted is smaller in diameter than the inner holder 53. Further, the through hole 521 is larger in diameter than the core body 3. Therefore, a stepped portion 524 is formed in the storage space 522 of the outer holder 52. The stepped portion 524 prevents the inner holder 53 stored in the storage space 522 from falling off the outer holder 52 toward the core body 3 side.

The inner holder 53 includes a locking member 531 and a pressing member 532 as illustrated in FIG. 17A. The locking member 531 engages with the core body 3 to lock the core body 3 in the inner holder 53. The pressing member 532 comes in contact with the pressure sensing device 51 and serves as an example of a second member that transfers the pressure applied to the core body 3 to the pressure sensing device 51 as will be described later.

The locking member 531 is cylindrical in appearance and made of a hard resin such as POM or polycarbonate. The outer diameter of the cylindrical portion of the locking member 531 is smaller than the diameter of the storage space 522 of the outer holder 52. This allows the locking member 531 to move axially inside the storage space 522 without rubbing against the inner wall of the storage space 522 of the outer holder 52.

Then, a recessed hole 5311 is axially formed in the center portion of the locking member 531 on the side of the core body 3 in the axial direction. The core body 3 is inserted into the recessed hole 5311. The recessed hole 5311 is cylindrical in shape and slightly larger than the outer diameter of the core body 3. An annular protruding portion 5312 is formed at a given axial position of the inner wall surface of the cylindrical recessed hole 5311 and protrudes from the inner wall surface to the space in the recessed hole 5311, and in the shape of an arc in this example.

On the other hand, an annular protruding portion 3a is formed in the direction orthogonal to the axial direction and at a given position of the end portion of the core body 3 as illustrated in FIG. 17A. The annular protruding portion 3a protrudes in the shape of an arc in this example. The annular protruding portion 5312 of the recessed hole 5311 and the annular protruding portion 3a of the core body 3 are formed respectively at given positions of the recessed hole 5311 and the core body 3 so that when the annular protruding portion 3a of the core body 3 climbs over the annular protruding portion 5312 of the recessed hole 5311, the front edge face of the core body 3 abuts against the bottom portion of the recessed hole 5311. Then, when the front edge face of the core body 3 abuts against the bottom portion of the recessed hole 5311, the annular protruding portion 5312 engages with the annular protruding portion 3a, thus locking the core body 3 in the recessed hole 5311 of the locking member 531. As a result, the core body 3 is maintained locked in the recessed hole 5311 of the locking member 531 unless an attempt is made to pull out the core body 3 with a given force.

A description will be given next of the pressing member 532 as an example of the second member of the inner holder 53. The pressing member 532 is made of an elastic member in the present embodiment. The elastic member of the pressing member 532 is made, for example, of a silicon resin, and, of a silicon rubber whose elastic coefficient (elastic modulus) is smaller, i.e., whose elasticity is higher, than that of the material of the locking member 531 in particular in this example.

The pressing member 532 has a cylindrical protruding portion 532a that is formed to protrude in a projecting shape from the axial end face of the cylindrical base portion. Then, the cylindrical base portion fits into a recessed portion formed in the locking member 531, thus coupling the pressing member 532 to the locking member 531. At this time, the end face of the cylindrical protruding portion 532a of the pressing member 532 faces the pressure sensing device 51, thus allowing the cylindrical protruding portion 532a to come in contact with the pressure sensing device 51. In this case, the center position of the end face of the cylindrical protruding portion 532a of the pressing member 532 is aligned with the center line of the inner holder 53.

As described above, the pressing member 532 is fitted into the locking member 531 for coupling, thus forming the inner holder 53. With the inner holder 53, the cylindrical protruding portion 532a of the pressing member 532 protrudes in a projecting shape from the end face of the locking member 531, causing the cylindrical protruding portion 532a to come in contact with the pressure sensing device 51 which will be described later.

A description will be given next of the pressure sensing device 51 stored in the storage space 522 of the outer holder 52. FIGS. 18A to 18D are diagrams for describing the pressure sensing device 51 in this example.

Figure 18A:
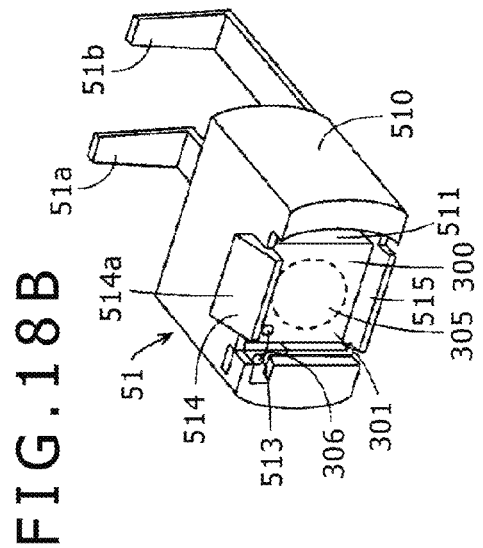
FIGS. 18A to 18D are diagrams illustrating a configuration example of major components of the position pointer of the position detector according to the third embodiment of the present invention.

As illustrated in FIG. 18A, the pressure sensing device 51 includes a semiconductor chip 300 and a socket 510. The semiconductor chip 300 makes up a capacitive pressure sensing section. The socket 510 stores the semiconductor chip 300 and includes metallic terminal pieces 51a and 51b.

Figure 18B:
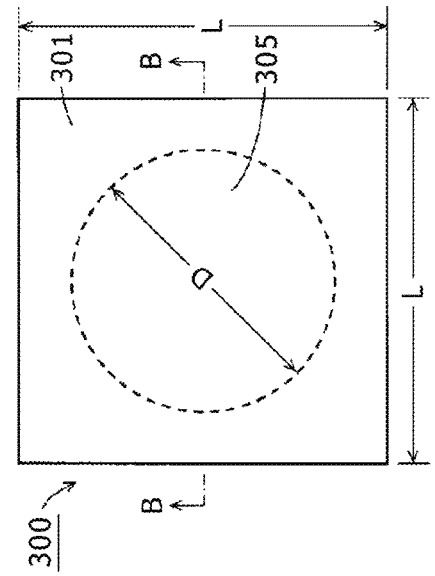
Figure 18C:
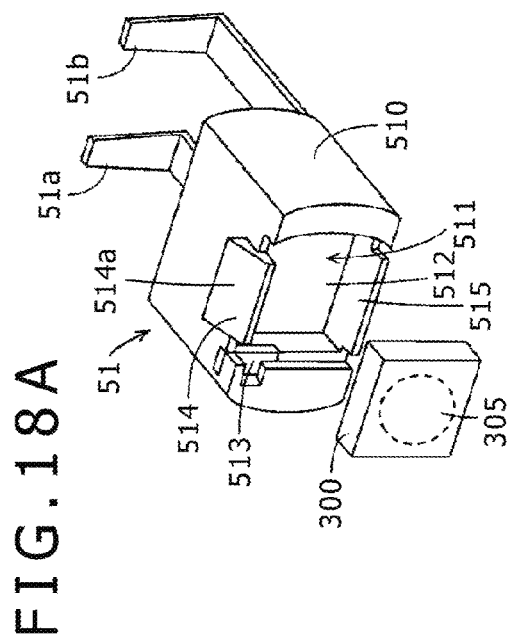
Figure 18D:
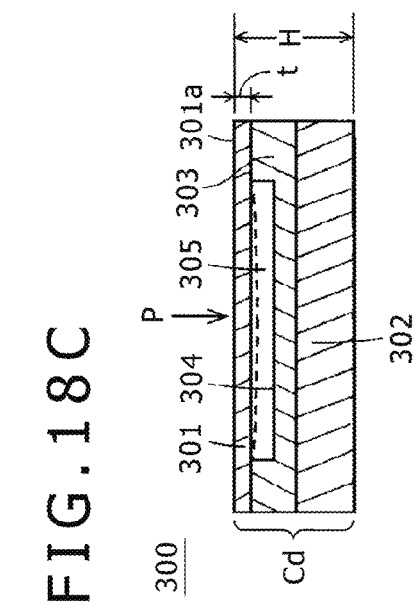

FIG. 18C illustrates a sectional view of the semiconductor chip 300. Then, FIG. 18D is a plan view of the semiconductor chip 300 as seen from the direction of application of a pressure P shown in FIG. 18C. FIG. 18C is a sectional view along line B-B in FIG. 18D.

The semiconductor chip 300 detects the applied pressure as a change in capacitance and has a configuration as shown in FIG. 18C in this example. The semiconductor chip 300 is in the form of a cuboid, for example, with vertical and horizontal lengths L of 1.5 mm and a height H of 0.5 mm as illustrated in FIG. 18D. The semiconductor chip 300 includes first and second electrodes 301 and 302, and an insulating layer (dielectric layer) 303 that is sandwiched between the first and second electrodes 301 and 302 as illustrated in FIG. 18C. The first and second electrodes 301 and 302 are conductors made of monocrystalline silicon (Si) in this example.

A circular recessed portion 304 is formed on the surface of the insulating layer 303 opposed to the first electrode 301 in this example. The recessed portion 304 has its center at the center position of this surface of the insulating layer 303. Thanks to the recessed portion 304, a space 305 is formed between the insulating layer 303 and the first electrode 301. In this example, the bottom surface of the recessed portion 304 is flat with a diameter D of, for example, 1 mm. On the other hand, the depth of the recessed portion 304 is about several tens to several hundreds of microns in this example.

Because of the presence of the space 305, when pressed from an upper surface 301a on the opposite side of the surface opposed to the second electrode 302, the first electrode 301 can be displaced in such a manner as to warp toward the space 305. The monocrystalline silicon as an example of the first electrode 301 has a thickness t which permits warping by the applied pressure P and which is smaller than the thickness of the second electrode 302.

In the semiconductor chip 300 as an example of a pressure sensing chip configured as described above, a capacitance Cd is formed between the first and second electrodes 301 and 302. Then, when a pressure is applied to the first electrode 301 from the upper surface 301a on the opposite side of the surface opposed to the second electrode 302, the first electrode 301 is displaced in such a manner as to warp toward the space 305, thus bringing the first electrode 301 closer to the second electrode 302 and increasing the capacitance Cd. The extent to which the first electrode 301 warps changes in proportion to the magnitude of pressure applied. Therefore, the capacitance Cd is a variable capacitance which is proportional to the magnitude of the pressure P applied to the semiconductor chip 300. It should be noted that monocrystalline silicon taken as an example of the first electrode 301 warps several microns due to the pressure P. The capacitance Cd changes in the range of 0 to 10 pF (picofarad) due to the pressure P that gives rise to this warping.

The socket 510 is made, for example, of a resin and flat as shown in FIGS. 18A and 18B. The metallic terminal pieces 51a and 51b are fastened to the socket 510 by resin molding.

Then, the socket 510 includes a storage recessed portion 511 for the semiconductor chip 300 configured as described above on its front surface portion on the opposite side of the surface from which the metallic terminal pieces 51a and 51b are led out. A terminal plate 512 formed on the end portion of the metallic terminal piece 51b on the opposite side of the bent portion thereof is exposed on the bottom portion of the storage recessed portion 511. It should be noted that, of course, the terminal plate 512 on the bottom portion of the storage recessed portion 511 may be electrically connected to the metallic terminal piece 51b rather than being part thereof.

Further, a terminal plate 513 formed on the end portion of the metallic terminal piece 51a on the opposite side of the bent portion thereof is exposed on part of the surrounding surface of the storage recessed portion 511 of the front surface of the socket 510. It should be noted that, of course, the terminal plate 513 may also be electrically connected to the metallic terminal piece 51a rather than being part thereof.

The semiconductor chip 300 with, for example, a conductive adhesive deposited on the second electrode 302 is stored in the storage recessed portion 511 of the socket 510 in such a manner that the second electrode 302 comes on the bottom side of the storage recessed portion 511. With the semiconductor chip 300 stored in this manner, the second electrode 302 of the semiconductor chip 300 and the terminal plate 512 are electrically connected, that is, the second electrode 302 and the metallic terminal piece 51b are electrically connected.

Then, with the semiconductor chip 300 stored in the storage recessed portion 511, the first electrode 301 of the semiconductor chip 300 is exposed on the front side. Then, the exposed first electrode 301 of the semiconductor chip 300 and the terminal plate 513 exposed at a given position of the surrounding area of the storage recessed portion 511 are connected together with a metal wire 306 by soldering as illustrated in FIG. 18B. As a result, the first electrode 301 of the semiconductor chip 300 and the metallic terminal piece 51a are electrically connected.

As described above, the pressure sensing device 51 has the semiconductor chip 300 stored in the storage recessed portion 511 of the socket 510.

Then, in this example, locking lugs 514 and 515 are formed respectively at the upper and lower positions sandwiching the storage recessed portion 511 on the front surface of the socket 510 of the pressure sensing device 51. The locking lugs 514 and 515 have upward and downward protruding portions 514a and 515a (protruding portion 515a is not shown in FIGS. 18A and 18B), respectively.

Although not shown, on the other hand, openings are formed on the upper and lower wall surfaces in the area of the storage space 522 of the outer holder 52. The protruding portions 514a and 515a of the locking lugs 514 and 515 of the socket 510 of the pressure sensing device 51 engage with the openings.

The pressure sensing device 51 is inserted into the storage space 522 of the outer holder 52 in such a manner that the first electrode 301 of the semiconductor chip 300 comes in contact with the cylindrical protruding portion 532a of the pressing member 532. Then, the protruding portions 514a and 515a of the locking lugs 514 and 515 of the socket 510 engage with the openings of the outer holder 52, thus storing the pressure sensing device 51 in the storage space 522 of the outer holder 52 and fastening the pressure sensing device 51 therein. When the pressure sensing device 51 is stored and fastened in the storage space 522, the upper surface 301a of the first electrode 301 of the semiconductor chip 300 stored and held in the pressure sensing device 51 is in contact with the tip surface of the cylindrical protruding portion 532a of the pressing member 532.

Then, in this condition, the center position of the tip surface of the cylindrical protruding portion 532a of the pressing member 532 is aligned with the center position of the circular space 305 under the first electrode 301 of the semiconductor chip 300. The diameter of the cylindrical protruding portion 532a of the pressing member 532 is 0.7 mm, and that of the circular space 305 under the first electrode 301 is 1 mm. As a result, the cylindrical protruding portion 532a of the pressing member 532 is smaller in diameter than the circular space 305. It should be noted that the sizes of the diameters of the cylindrical protruding portion 532a of the pressing member 532 and the circular space 305 are merely an example. However, the relationship of the cylindrical protruding portion 532a of the pressing member 532 being smaller in diameter than the circular space 305 is maintained.

It should be noted that, in the present embodiment, a plurality of axial ribs (projecting rims) are formed on the inner wall surface of the storage space 522 of the outer holder 52. These ribs are provided to restrict the position of the pressure sensing device 51 in the storage space 522 of the outer holder 52. That is, these ribs come in contact with the outer perimeter side surface of the socket 510 of the pressure sensing device 51, thus restricting the position of the pressure sensing device 51 in such a manner that the center position of the circular space 305 under the first electrode 301 of the semiconductor chip 300 stored in the pressure sensing device 51 is aligned with the center position of the tip surface of the cylindrical protruding portion 532a of the pressing member 532.

The tips of the metallic terminal pieces 51a and 51b formed for the socket 510 are fitted into through holes 4a and 4b formed in the printed circuit board 4 and soldered in place as illustrated in FIG. 17A, thus connecting the metallic terminal pieces 51a and 51b to the circuit section formed on the printed circuit board 4.

In the position pointer 1C according to the third embodiment configured as described above, when a writing pressure is applied to the core body 3, the locking member 531 of the inner holder 53 with which the core body 3 engages in the writing pressure detection module 50 is displaced in such a manner as to axially press the semiconductor chip 300 of the pressure sensing device 51 in the outer holder 52 proportionally to the writing pressure applied. Thanks to the pressing member 532 fitted into the locking member 531, therefore, the first electrode 301 of the semiconductor chip 300 of the pressure sensing device 51 warps toward the second electrode 302 via the space 305. As a result, the capacitance Cd formed between the first and second electrodes 301 and 302 of the semiconductor chip 300 changes proportionally to the change in writing pressure. Then, as a result of the change in the capacitance Cd, the position pointer 1C detects the writing pressure applied to the core body 3 and transmits detected writing pressure data to the position detector 20 in the form of an ASK modulated signal during a writing pressure data transmission period.

Then, the position pointer 1C according to the third embodiment switches between the electrodes 6C, 7C, and 8C, and generates an ASK modulated signal based on the AC signal Sc, and transmits the ASK modulated signal to the position detector 20 as in the first embodiment. Identification information for identifying the electrodes 6C, 7C, and 8C is included in the ASK modulated signal to be transmitted, thus allowing the position detector 20 to detect the position pointed to by the position pointer 1C, and the rotation angle and the tilt angle of the position pointer 1C as described earlier.

Modified Example of the Third Embodiment

Figure 17D:
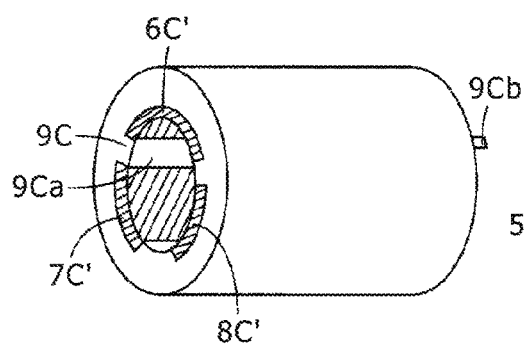
Figure 17E:
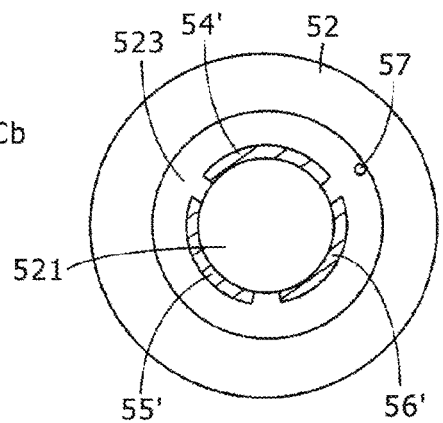

The three electrodes 6C, 7C, and 8C are formed on the outer perimeter surface of the tubular body 9C in the position pointer 1C according to the third embodiment. As illustrated in FIG. 17D, however, three electrodes 6C', 7C', and 8C' may be formed on the inner perimeter surface of the tubular body 9C. In this case, conductor pieces 54', 55', and 56' are formed on the bottom surface of the recessed portion 523 of the outer holder 52 as illustrated in FIG. 17E. When the tubular body 9C is fitted in the recessed portion 523, the conductor pieces 54', 55', and 56' come in contact with and are electrically connected to the three electrodes 6C', 7C', and 8C', respectively, on the inner perimeter surface of the tubular body 9C. It should be noted that wires are provided in the outer holder 52 to connect the conductor pieces 54', 55', and 56' to the printed circuit board 4 as in the above embodiment.

Fourth Embodiment

In the position pointer 1A according to the second embodiment described above, the signal electrode 9 is tubular in shape and has a through hole into which the core body 3 is inserted. However, a core body made of a conductive metal or conductive resin may be used rather than using the tubular signal electrode 9.

Figure 19A:
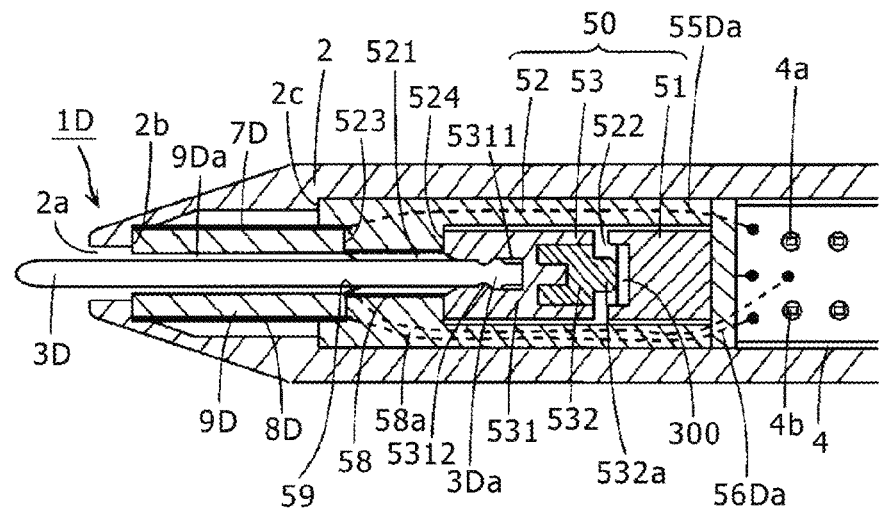
FIGS. 19A to 19C are diagrams illustrating a configuration example of major components of a position pointer of a position detector according to a fourth embodiment of the present invention.
Figure 19B:
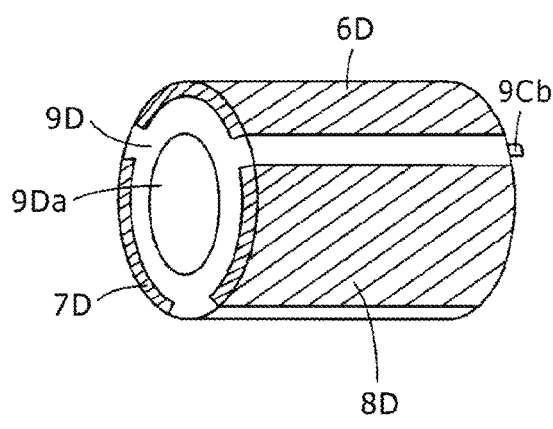
Figure 19C:
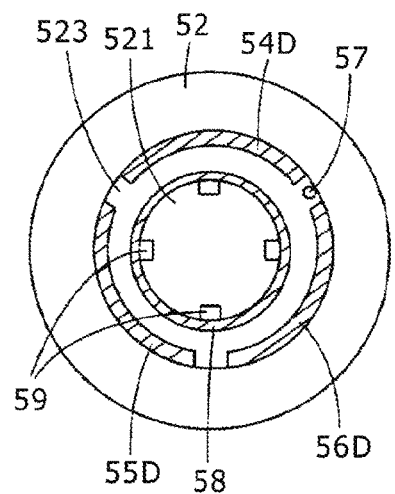

FIGS. 19A to 19C are diagrams for describing a position pointer 1D using a core body 3D made of a conductive metal or conductive resin as a signal electrode. The position pointer 1D shown in FIGS. 19A to 19C uses the writing pressure detection module 50 described above to detect the writing pressure applied to the core body 3D. FIG. 19A is a sectional view for describing the configuration of the position pointer 1D on the side of the core body 3D.

Then, in the position pointer 1D in the example of FIGS. 19A to 19C, three inhibiting electrodes 6D, 7D, and 8D are formed on the outer perimeter surface of a tubular body 9D into which the core body 3D is inserted as illustrated in FIGS. 19A and 19B.

Then, conductor pieces 54D, 55D, and 56D are formed on the bottom surface of the recessed portion 523 of the outer holder 52 of the writing pressure detection module 50 as illustrated in FIG. 19C, the tubular body 9D being fitted into the recessed portion 523. The conductor pieces 54D, 55D, and 56D come in contact with and are electrically connected to the three electrodes 6D, 7D, and 8D, respectively, on the outer perimeter surface of the tubular body 9D. Then, wires 54Da, 55Da, and 56Da (wire 54Da is not shown in FIG. 19A) are provided in the outer holder 52 respectively to connect the conductor pieces 54D, 55D, and 56D to the printed circuit board 4.

Further, in the present embodiment, a conductor layer 58 is formed by lamination through printing or vapor deposition on the wall surface of the through hole 521 of the outer holder 52. Conductor brushes 59 are formed from the conductor layer 58. Then, a wire 58a, formed by insert molding, is provided in the outer holder 52 to connect the conductor layer 58 and the printed circuit board 4 as illustrated in FIG. 19A.

Therefore, when the core body 3D, a conductor, is inserted into the through hole 521 of the outer holder 52, the core body 3D is electrically connected to the conductor layer 58 via the conductor brushes 59 as illustrated in FIG. 19A. As a result, the core body 3D, a conductor, is connected to the output end of the oscillation circuit of the printed circuit board 4, thus allowing the core body 3D to serve as a signal electrode.

An annular protruding portion 3Da is formed in the direction orthogonal to the axial direction and at a given position of the end portion of the core body 3D as illustrated in FIG. 19A. The annular protruding portion 3Da protrudes in the shape of an arc in this example. The annular protruding portion 5312 of the recessed hole 5311 and the annular protruding portion 3Da of the core body 3D are formed respectively at given positions of the recessed hole 5311 and the core body 3D so that when the annular protruding portion 3Da of the core body 3D climbs over the annular protruding portion 5312 of the recessed hole 5311, the front edge face of the core body 3D abuts against the bottom portion of the recessed hole 5311. Then, when the front edge face of the core body 3D abuts against the bottom portion of the recessed hole 5311, the annular protruding portion 5312 engages with the annular protruding portion 3Da, thus locking the core body 3D in the recessed hole 5311 of the locking member 531. As a result, the core body 3D is maintained locked in the recessed hole 5311 of the locking member 531 unless an attempt is made to pull out the core body 3D with a given force.

Then, in the position pointer 1D in this example, the inhibiting electrodes 6D, 7D, and 8D are selectively grounded respectively via switching circuits 13D, 14D, and 15D, thus allowing the position detector 20 to detect the position pointed to by the position pointer 1D, the writing pressure applied by the position pointer 1D, and the rotation angle and the tilt angle of the position pointer 1D as described in the second embodiment.

Figure 20:
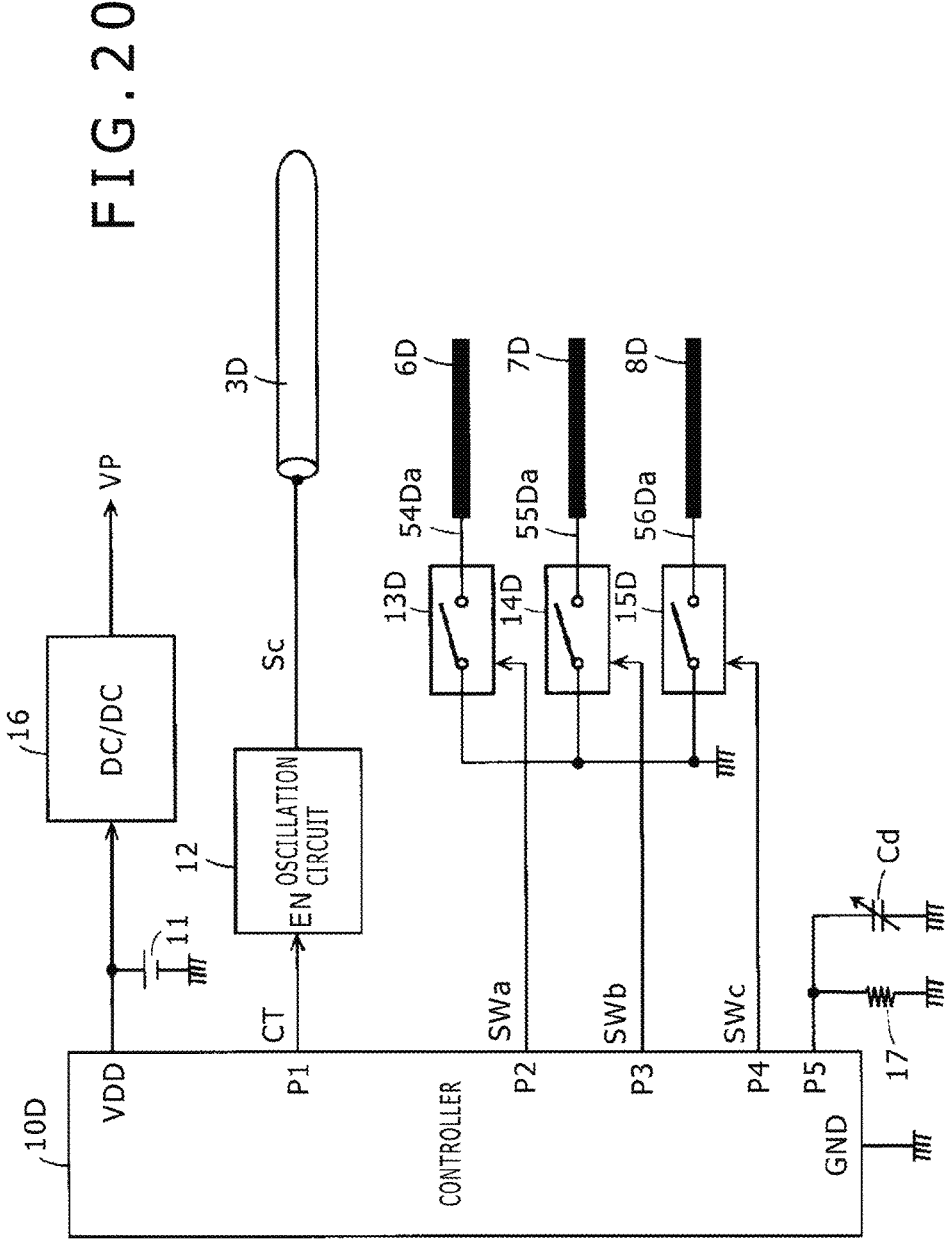
FIG. 20 is a diagram illustrating an example of an internal circuit configuration of the position pointer of the position detector according to the fourth embodiment of the present invention.

FIG. 20 illustrates a circuit configuration example of the position pointer 1D. That is, in the position pointer 1D, the switching circuits 13D, 14D, and 15D are provided respectively between the inhibiting electrodes 6D, 7D, and 8D and the grounding end. Then, a controller 10D supplies the enable signal CT to the oscillation circuit 12 and switching control signals SWa, SWb, and SWc to the switching circuits 13D, 14D, and 15D, respectively. Thanks to control using the enable signal CT, the AC signal Sc from the oscillation circuit 12 is ASK-modulated and supplied to the core body 3D made of a conductor.

When the position pointer 1D is not in contact with the sensor section 100 of the position detector 20, the controller 10D turns OFF all the switching circuits 13D, 14D, and 15D, thus exercising control so that the AC signal is transmitted from the core body 3 without being inhibited.

Then, upon detecting that the position pointer 1D has come in contact with the sensor section 100 of the position detector 20 based on the capacitance of the variable capacitor Cd from the semiconductor chip 300 of the writing pressure detection module 50, the controller 10D switches sequentially between the inhibiting electrodes 6D, 7D, and 8D, thus inhibiting the transmission of the AC signal from the core body 3D with the grounded inhibiting electrodes 6D, 7D, and 8D as described in the second embodiment. Then, the controller 10D controls the oscillation circuit 12 using the enable signal CT so that the AC signal Sc is generated which includes identification information about the inhibiting electrode connected to the one among the three inhibiting electrodes 6D, 7D, and 8D which has been turned ON.

As a result, in this example, the position detector 20 detects not only the position pointed to by the position pointer 1D and the writing pressure applied thereto but also the rotation angle and the tilt angle of the position pointer 1D as in the second embodiment.

Other Embodiment or Modified Example

In the first and third embodiments described above, three electrodes are used to transmit an AC signal. However, three or more electrodes may be used. Further, three inhibiting electrodes are used in the second and fourth embodiments described above. However, three or more inhibiting electrodes may be used.

Further, in the above embodiments, the AC signal to be transmitted includes identification information for identifying the electrode selected by a switching circuit (both the electrode configured to transmit a signal and the electrode configured to inhibit the transmission of a signal). However, the AC signal to be transmitted may include identification information for identifying the electrode not selected by a switching circuit.

Still further, in the above embodiments, one of a plurality of three or more electrodes is selected. However, a plurality of electrodes may be selected at a time. In this case, identification information identifies each of the plurality of electrodes.

Still further, in the above embodiments, the pressure detection sensor configured to detect the writing pressure is not limited to that used in the above embodiments. Instead, a method can be used which is, for example, designed to optically detect the axial displacement of the core body of the position pointer.

It should be noted that, in the second and fourth embodiments in which inhibiting electrodes are provided to inhibit the transmission of an AC signal from the signal electrode, the interruption of transmission of the AC signal from the position pointer can be controlled using the inhibiting electrodes rather than interrupting the output of the AC signal from the oscillation circuit 12 using the enable signal from the controller 10A or 10D.

In this case, the controller 10A or 10D controls the oscillation circuit 12 to transmit the AC signal constantly. Then, in the period during which the transmission of the AC signal from the oscillation circuit 12 is stopped, the controller 10A or 10D pulls all the plurality of inhibiting electrodes down to the ground potential to inhibit the transmission of the AC signal from the signal electrode.

That is, in order to transmit the AC signal with the position pointer not in contact with the sensor section 100, none of the inhibiting electrodes are pulled down to the ground potential. In order not to transmit the AC signal, all the inhibiting electrodes are pulled down to the ground potential. On the other hand, in order to transmit the AC signal with the position pointer in contact with the sensor section 100 during the selection period of each inhibiting electrode, only the inhibiting electrode in question is pulled down to the ground potential. In order not to transmit the AC signal, all the inhibiting electrodes are pulled down to the ground potential.

It should be noted that, in the second and fourth embodiments, the inhibiting electrodes are grounded to inhibit the AC signal transmission. However, the AC signal transmission can be similarly inhibited by setting the inhibiting electrodes to a given DC potential such as supply voltage potential.

It should be noted that, in the first to third embodiments, a rod-shaped core body 3 made of a resin is used as a core body. However, a so-called ball point pen refill may be used in place of the core body 3. In this case, the position pointer can be conveniently used also as a ball point pen.

It should be noted that, in the description of the above embodiments, a battery is used to drive each of the position pointers. However, a capacitor may be provided in each of the position pointers to accumulate the supply voltage for use as drive power source. In this case, a charge circuit configured to receive electric power energy from an external source and charge it by electromagnetic induction or electric field coupling may be used to accumulate the supply voltage in the capacitor. Alternatively, a charge terminal may be provided on the position pointer to supply a charge current from a dedicated charger via the charge terminal. Then, electric power energy (electromagnetic energy or electric field energy) from the external source may be supplied to the position pointer from the position detector or from a dedicated power supply device.

It is to be noted that the embodiment of the present invention is not limited to the foregoing embodiments, and that various changes can be made without departing from the spirit of the present invention.

The invention claimed is:

1. A position detection system comprising:
   a position pointer having a pen-shaped housing that includes an AC (alternating current) signal generation circuit configured to generate an AC signal; and
   a position detector, which is coupled with a sensor defining a sensor surface and which, in operation, receives the AC signal transmitted from the position pointer via the sensor,
   the position pointer including:
      a control circuit,
      a first electrode positioned on an axis of the pen-shaped housing in a tip portion of the pen-shaped housing, to which the control circuit supplies the AC signal from the AC signal generation circuit, and
      a second electrode positioned separately from the first electrode in the tip portion of the pen-shaped housing, which the control circuit selectively sets to a defined potential,
   the position detector including:
      a position detection circuit which, in operation, detects a position indicated by the position pointer on the sensor surface based on the AC signal transmitted from the first electrode of the position pointer and received at the sensor surface; and
      an angular information calculation circuit which, in operation, calculates at least a tilt angle of the position pointer relative to the sensor surface based on the AC signal supplied to the first electrode of the position pointer and transmitted from the first electrode to the sensor, wherein the AC signal transmitted from the first electrode is influenced by the second electrode of the position indicator that is selectively set to the defined potential by the control circuit of the position pointer.

2. The position detection system of claim 1, wherein:
   the second electrode includes plural electrode pieces arranged to surround the axis of the pen-shaped housing, which are respectively and selectively set to the defined potential, and
   the angular information calculation circuit, in operation, calculates a rotation angle of the position pointer about a direction perpendicular to the sensor surface based on the AC signal transmitted from the first electrode of the position pointer when the plural electrode pieces that form the second electrode are respectively and selectively set to the defined potential.

3. The position detection system of claim 2, wherein:
   the control circuit of the position pointer, in operation, generates information indicating which of the plural electrode pieces forming the second electrode are set to the defined potential, to be transmitted from the position pointer to the sensor.

4. The position detection system of claim 1, wherein:
   the position pointer includes:
   a core body protruding from the tip portion of the pen-shaped housing, and
   a pressure detection sensor configured to detect a pressure applied to the core body,
   wherein, responsive to the pressure detection sensor detecting the pressure that is smaller than a defined pressure value, the control circuit of the position pointer supplies the AC signal to at least the second electrode.

5. The position detection system of claim 1, wherein:
   the position pointer includes a conductive core body, which protrudes from the tip portion of the pen-shaped housing and which forms the first electrode, and
   the second electrode is arranged to surround the conductive core body.

6. The position detection system of claim 1, wherein the defined potential is a ground potential.

7. A position pointer comprising:
   a pen-shaped housing,
   an AC (alternating current) signal generation circuit included in the pen-shaped housing and configured to generate an AC signal, to be transmitted to a sensor of a position detector,
   a control circuit,
   a first electrode positioned on an axis of the pen-shaped housing in a tip portion of the pen-shaped housing, to which the control circuit supplies the AC signal from the AC signal generation circuit, and
   a second electrode positioned separately from the first electrode in the tip portion of the pen-shaped housing, which is selectively set to a defined potential by the control circuit so that the AC signal transmitted from the first electrode is influenced by the second electrode of the position pointer.

8. The position pointer of claim 7, wherein:
   the second electrode includes plural electrode pieces arranged to surround the axis of the pen-shaped housing, which the control circuit respectively and selectively set to the defined potential.

9. The position pointer of claim 8, wherein:
   the control circuit, in operation, generates information indicating which of the plural electrode pieces forming the second electrode are set to the defined potential, to be transmitted from the position pointer to the sensor of the position detector.

10. The position pointer of claim 7, comprising:
    a core body protruding from the tip portion of the pen-shaped housing, and
    a pressure detection sensor configured to detect a pressure applied to the core body,
    wherein, responsive to the pressure detection sensor detecting the pressure that is smaller than a defined pressure value, the control circuit supplies the AC signal to at least the second electrode.

11. The position pointer of claim 7, comprising:
    a conductive core body, which protrudes from the tip portion of the pen-shaped housing and which forms the first electrode,
    wherein the second electrode is arranged to surround the conductive core body.

12. The position pointer of claim 7, wherein the defined potential is a ground potential.

13. A position detector, which is coupled with a sensor defining a sensor surface, comprising:
    a position detection circuit which, in operation, detects a position indicated by a pen-shaped position pointer on the sensor surface based on an AC alternating current) signal, which is transmitted from a first electrode of the pen-shaped position pointer positioned on an axis of the pen-shaped position pointer in a tip portion of the pen-shaped position pointer and received by the sensor, and an angular information calculation circuit which, in operation, calculates at least a tilt angle of the pen-shaped position pointer relative to the sensor surface based on the AC signal supplied to the first electrode of the pen-shaped position pointer and transmitted from the first electrode to the sensor, wherein the AC signal transmitted from the first electrode is influenced by a second electrode of the pen-shaped position pointer, which is positioned separately from the first electrode in the tip portion of the pen-shaped position and is selectively set to a defined potential by the pen-shaped position pointer.

14. The position detector of claim 13, wherein:
the second electrode of the pen-shaped position pointer includes plural electrode pieces arranged to surround the axis of the pen-shaped position pointer, which are respectively and selectively set to the defined potential, and the angular information calculation circuit, in operation, calculates a rotation angle of the pen-shaped position pointer about a direction perpendicular to the sensor surface based on the AC signal transmitted from the first electrode of the pen-shaped position pointer when the plural electrode pieces that form the second electrode of the pen-shaped position pointer are respectively and selectively set to the defined potential.

15. The position detector of claim 14, wherein:
the angular information calculation circuit, in operation, calculates the rotation angle based on information indicating which of the plural electrode pieces forming the second electrode are set to the defined potential, wherein the information is transmitted from the pen-shaped position pointer and received by the sensor.

16. The position detector of claim 13, wherein the defined potential is a ground potential.

* * * * *

UNITED STATES PATENT AND TRADEMARK OFFICE
CERTIFICATE OF CORRECTION

PATENT NO. : 10,296,106 B2
APPLICATION NO. : 15/965388
DATED : May 21, 2019
INVENTOR(S) : Hideyuki Hara Page 1 of 1

It is certified that error appears in the above-identified patent and that said Letters Patent is hereby corrected as shown below:

In the Claims

Column 32, Claim 13, Line 62:
"an AC alternating current)" should read as --an AC (alternating current)--

Signed and Sealed this
Twenty-first Day of January, 2020

Andrei Iancu
*Director of the United States Patent and Trademark Office*